United States Patent
Chaudhary et al.

(10) Patent No.: US 11,863,877 B2
(45) Date of Patent: Jan. 2, 2024

(54) METHOD AND APPARATUS FOR REMOVING FLICKER IN A VIDEO

(71) Applicant: SAMSUNG ELECTRONICS CO., LTD., Suwon-si (KR)

(72) Inventors: Vidushi Chaudhary, Bangalore (IN); Rishi Kaushik, Bangalore (IN); Fateh Singh, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/702,457

(22) Filed: Mar. 23, 2022

(65) Prior Publication Data

US 2023/0199322 A1 Jun. 22, 2023

Related U.S. Application Data

(63) Continuation of application No. PCT/KR2022/002371, filed on Feb. 17, 2022.

(30) Foreign Application Priority Data

Dec. 16, 2021 (IN) .............................. 202141058828

(51) Int. Cl.
*H04N 23/745* (2023.01)
*H04N 23/71* (2023.01)
*H04N 25/705* (2023.01)

(52) U.S. Cl.
CPC ........... *H04N 23/745* (2023.01); *H04N 23/71* (2023.01); *H04N 25/705* (2023.01)

(58) Field of Classification Search
CPC ..... H04N 23/745; H04N 23/71; H04N 25/705
See application file for complete search history.

(56) References Cited

U.S. PATENT DOCUMENTS

| 7,764,312 B2 | 7/2010 | Ono et al. |
| 7,777,787 B2 * | 8/2010 | Hakola .................. H04N 23/71 348/226.1 |

(Continued)

FOREIGN PATENT DOCUMENTS

JP 2019-201248 A 11/2019

OTHER PUBLICATIONS

Kanj, A., "Flicker Removal and Color Correction for High Speed Videos", Ecole Doctorale Mathematiques et Sciences et Technologies de l'Information et de la Communication, Jul. 7, 2017, pp. 1-161 (179 pages).

(Continued)

*Primary Examiner* — Luong T Nguyen
(74) *Attorney, Agent, or Firm* — Sughrue Mion, PLLC

(57) ABSTRACT

Provided is a method for removing flicker in a video by an electronic device, the method including obtaining a plurality of red-green-blue (RGB) video frames of a scene in a field of preview of a camera included in the electronic device, obtaining a position of at least one light source in the plurality of video frames, obtaining a brightness of the at least one light source based on the position of the light source, obtaining a de-flickering factor for each pixel in the plurality of video frames based on the position of the at least one light source and the brightness of the at least one light source, and applying the de-flickering factor to each of the plurality of video frames to remove the flicker.

20 Claims, 26 Drawing Sheets

(56) References Cited

U.S. PATENT DOCUMENTS

| | | | |
|---|---|---|---|
| 8,937,271 B2 | 1/2015 | Macknik | |
| 9,805,237 B2 | 10/2017 | Feng et al. | |
| 10,944,912 B2* | 3/2021 | Herman | H04N 23/71 |
| 11,108,970 B2* | 8/2021 | Nossek | H04N 23/745 |
| 2010/0053369 A1* | 3/2010 | Nagai | H04N 23/70 |
| | | | 348/241 |
| 2017/0201668 A1 | 7/2017 | Hong et al. | |
| 2019/0166298 A1 | 5/2019 | Tasdizen et al. | |
| 2020/0389582 A1 | 12/2020 | Herman | |
| 2021/0014402 A1 | 1/2021 | Nossek et al. | |

OTHER PUBLICATIONS

International Search Report (PCT/ISA/210) dated Sep. 7, 2022 by the International Searching Authority in counterpart International Patent Application No. PCT/KR2022/002371.

Written Opinion (PCT/ISA/237) dated Sep. 7, 2022 by the International Searching Authority in counterpart International Patent Application No. PCT/KR2022/002371.

\* cited by examiner

FIG. 11B — Angle of each pixel w.r.t. Light Source for Frame 1

| | | | | |
|---|---|---|---|---|
| 0.73 | 0.97 | 0.71 | 0.81 | 0.66 |
| 0.73 | 0.67 | 0.97 | 0.64 | 0.65 |
| 0.77 | 0.6 | 0.61 | 0.64 | 0.78 |
| 0.69 | 0.85 | 0.91 | 0.5 | 0.6 |
| 0.64 | 0.78 | 0.59 | 0.73 | 0.83 |

FIG. 11C — Angle of each pixel w.r.t. Light Source for Frame 2

| | | | | |
|---|---|---|---|---|
| 0.54 | 0.88 | 0.86 | 0.58 | 0.85 |
| 0.53 | 0.88 | 0.59 | 0.64 | 0.69 |
| 0.88 | 0.64 | 0.67 | 0.88 | 0.62 |
| 0.66 | 0.98 | 0.89 | 0.87 | 0.56 |
| 0.77 | 0.52 | 0.8 | 0.96 | 0.83 |

FIG. 11D — Angle of each pixel w.r.t. Light Source for Frame 3

| | | | | |
|---|---|---|---|---|
| 0.87 | 0.62 | 0.67 | 0.57 | 0.97 |
| 0.56 | 0.98 | 0.7 | 0.59 | 0.68 |
| 0.86 | 0.79 | 0.94 | 0.91 | 0.99 |
| 0.59 | 0.98 | 0.92 | 0.91 | 0.98 |
| 0.66 | 0.82 | 0.89 | 0.86 | 0.63 |

FIG. 11E

| | | | | |
|---|---|---|---|---|
| 59.7945 | 161.9 | 61.97 | 54.32 | 93.94 |
| 165.753 | 192.5 | 79.38 | 78.13 | 183.1 |
| 105.195 | 76.67 | 227.9 | 173.4 | 71.79 |
| 79.7101 | 71.76 | 54.95 | 118 | 161.7 |
| 120.313 | 194.9 | 232.2 | 98.63 | 139.8 |

FIG. 11F

| | | | | |
|---|---|---|---|---|
| 237 | 70.45 | 183.7 | 244.8 | 131.8 |
| 249.1 | 89.77 | 203.4 | 203.1 | 57.97 |
| 175 | 235.9 | 219.4 | 65.91 | 193.5 |
| 85.15 | 82.24 | 104.5 | 57.47 | 285.7 |
| 94.81 | 292.3 | 130 | 149 | 154.2 |

FIG. 11G

| | | | | |
|---|---|---|---|---|
| 108 | 87.1 | 95.52 | 214 | 59.79 |
| 141.1 | 88.78 | 108.6 | 208.5 | 107.4 |
| 124.4 | 88.61 | 147.9 | 153.8 | 80.81 |
| 133.9 | 93.88 | 129.3 | 98.9 | 119.4 |
| 210.6 | 65.85 | 98.88 | 162.8 | 252.4 |

| 3.045 | 2.17  | 2.345 | 1.995 | 3.395 |
|-------|-------|-------|-------|-------|
| 1.96  | 3.43  | 2.45  | 2.065 | 2.38  |
| 3.01  | 2.765 | 3.29  | 3.185 | 3.465 |
| 2.065 | 3.43  | 3.22  | 3.185 | 3.43  |
| 2.31  | 2.87  | 3.115 | 3.01  | 2.205 |

FIG. 11K

| 0.65 | 0.74 | 0.73 | 0.86 | 0.64 |
|------|------|------|------|------|
| 0.94 | 0.76 | 0.76 | 0.57 | 0.91 |
| 0.84 | 0.57 | 0.54 | 0.53 | 0.97 |
| 0.69 | 0.51 | 0.78 | 0.75 | 0.67 |
| 0.68 | 0.91 | 0.5  | 0.63 | 0.72 |

FIG. 11N

| -20.54 | -33.47 | -32.71 | -22.06 | -32.33 |
|--------|--------|--------|--------|--------|
| -20.16 | -33.47 | -22.44 | -24.34 | -26.24 |
| -33.47 | -24.34 | -25.48 | -33.47 | -23.58 |
| -25.1  | -37.27 | -33.85 | -33.09 | -21.3  |
| -29.29 | -19.78 | -30.43 | -36.51 | -31.57 |

FIG. 11J

| 0.88 | 0.82 | 0.68 | 0.58 | 0.65 |
|------|------|------|------|------|
| 0.77 | 0.52 | 0.66 | 0.87 | 0.98 |
| 0.56 | 0.65 | 0.93 | 0.94 | 0.56 |
| 0.65 | 0.64 | 0.72 | 0.73 | 0.54 |
| 0.61 | 0.81 | 0.51 | 0.71 | 0.81 |

FIG. 11M

| 24.1481 | 32.09 | 23.49 | 26.79 | 21.83 |
|---------|-------|-------|-------|-------|
| 24.1481 | 22.16 | 32.09 | 21.17 | 21.5  |
| 25.4713 | 19.85 | 20.18 | 21.17 | 25.8  |
| 22.8249 | 28.12 | 30.1  | 16.54 | 19.85 |
| 21.1709 | 25.8  | 19.52 | 24.15 | 27.46 |

FIG. 11I

| 0.91 | 0.85 | 0.95 | 0.65 | 0.97 |
|------|------|------|------|------|
| 0.81 | 0.81 | 0.76 | 0.94 | 0.54 |
| 0.81 | 0.51 | 0.62 | 0.67 | 0.89 |
| 0.57 | 0.58 | 0.64 | 0.85 | 0.51 |
| 0.7  | 0.55 | 0.98 | 0.89 | 0.75 |

| 1.23961 | 0.869 | 1.269 | 1.136 | 1.216 |
|---|---|---|---|---|
| 0.72154 | 1.256 | 1.015 | 1.082 | 1.082 |
| 1.1892 | 0.895 | 0.828 | 0.681 | 1.082 |
| 0.68145 | 1.136 | 0.855 | 0.775 | 0.762 |
| 1.00214 | 1.189 | 1.309 | 0.735 | 0.935 |

FIG. 11P

| 0.914 | 0.816 | 0.956 | 1.153 | 1.237 |
|---|---|---|---|---|
| 1.378 | 1.223 | 0.928 | 0.731 | 1.083 |
| 0.787 | 1.322 | 1.308 | 0.914 | 0.787 |
| 0.759 | 1.026 | 1.012 | 0.9 | 0.914 |
| 1.139 | 0.998 | 0.717 | 1.139 | 0.858 |

FIG. 11Q

| 0.896 | 1.204 | 1.022 | 1.036 | 0.91 |
|---|---|---|---|---|
| 1.275 | 0.798 | 1.064 | 1.064 | 1.317 |
| 1.359 | 0.742 | 0.756 | 0.798 | 1.176 |
| 0.938 | 1.05 | 1.092 | 0.714 | 0.966 |
| 1.008 | 0.882 | 0.7 | 1.275 | 0.952 |

FIG. 11R

| 31.2983 | 27.87 | 29.81 | 30.43 | 26.55 |
|---|---|---|---|---|
| 17.4238 | 27.84 | 32.58 | 22.91 | 23.27 |
| 30.2905 | 17.77 | 16.72 | 14.43 | 27.93 |
| 15.5541 | 31.93 | 25.74 | 12.82 | 15.12 |
| 21.2162 | 30.68 | 25.56 | 17.75 | 25.68 |

FIG. 11S

| -18.77 | -27.3 | -31.27 | -25.43 | -40 |
|---|---|---|---|---|
| -27.78 | -40.94 | -20.82 | -17.8 | -28.41 |
| -26.35 | -32.17 | -33.32 | -30.59 | -18.57 |
| -19.06 | -38.26 | -34.27 | -29.78 | -19.47 |
| -33.35 | -19.74 | -21.82 | -41.58 | -27.08 |

FIG. 11T

| 2.729 | 2.614 | 2.397 | 2.068 | 3.091 |
|---|---|---|---|---|
| 2.498 | 2.738 | 2.608 | 2.198 | 3.133 |
| 4.089 | 2.052 | 2.488 | 2.543 | 4.076 |
| 1.938 | 3.603 | 3.517 | 2.275 | 3.315 |
| 2.329 | 2.532 | 2.181 | 3.836 | 2.1 |

METHOD AND APPARATUS FOR REMOVING FLICKER IN A VIDEO

CROSS-REFERENCE TO RELATED APPLICATION

This application is a continuation application, claiming priority under § 365(c), of an International application No. PCT/KR2022/002371, filed on Feb. 17, 2022, which is based on and claims the benefit of an Indian Patent Application No. 202141058828, filed on Dec. 16, 2021, in the Indian Patent Office, the disclosure of each of which is incorporated by reference herein in its entirety.

BACKGROUND

1. Field

The present disclosure relates to image processing systems, and more specifically to a method and an apparatus for removing flicker in a slow-motion video.

2. Description of Related Art

In artificial light, for example, a fluorescent bulb, a light emitting diode (LED) bulb, condition, there is fluctuation in light intensity which is not detectable by human eyes. As the human eye views around 30 to 60 hz, and hence quick variations, for example, variations around 120 hz are not detectable by the human eye. However, a slow motion camera captures a scene at a higher frame-rate, for example a frame-rate that is greater than 120 hz, and is able to capture the quick variations in the light intensity.

Artificial lights such as a light bulb, and LEDs are powered by alternating current (AC), in which electrons in an electricity move in and out of a circuit in cycles. In 1 cycle or Hertz, the light bulb turns off 2 times, as the electron alternates in and out.

Electricity may run on 60 Hz, or 50 Hz. Accordingly, the electric bulb may turn on and off between 100 to 120 time/sec. While the human eye cannot see a flicker, the slow-motion camera lens makes the flickering viewable to a human eye.

The camera opens and shuts its motion capturing shutter a little bit faster than the speed of a flickering LED, making the flickering obvious. For cameras, when a frequency of a camera's frame rate per second (FPS) and the artificial lights does not match, the flicker becomes visible on the camera screen.

Solutions for removing flicker in a slow motion videos have been provided. However, in related art, flicker is not completely removed and have accuracy issues. Further, in related art, the flicker is introduced during motion at certain places where the flicker was not actually present. In addition, in related art, artifacts are introduced while removing the flicker. Further, the existing arts discloses applying same transformation/processing on an entire block irrespective of an angle of an object with regards to the light.

Thus, it is desired to address the above mentioned disadvantages or other shortcomings.

SUMMARY

One or more embodiments provide a method and device of removing flicker in a slow motion video. In an embodiment, an actual brightness of a light source in a scene and a target brightness of the light source is determined. Based on the actual brightness and the target brightness, a de-flicker factor is determined. Further, the de-flicker factor is applied to each frames in the scene.

According to an aspect of an embodiment, there is provided a method for removing flicker in a video by an electronic device, the method including obtaining a plurality of red-green-blue (RGB) video frames of a scene in a field of preview of a camera included in the electronic device, obtaining a position of at least one light source in the plurality of video frames, obtaining a brightness of the at least one light source based on the position of the light source, obtaining a de-flickering factor for each pixel in the plurality of video frames based on the position of the at least one light source and the brightness of the at least one light source, and applying the de-flickering factor to each of the plurality of video frames to remove the flicker.

The obtaining the position of at least one light source in the plurality of video frames may include identifying at least one region of a maximum brightness in the plurality of video frames as a bright cluster, obtaining a three dimensional (3-D) map of the scene based on a depth map of the scene, and obtaining the position of the at least one light source based on the identified bright cluster and the 3D map of the scene.

The obtaining the position of the at least one light source based on the bright cluster and the 3D map may include obtaining a surface perpendicular and an angle of reflection of the at least one light source, obtaining an incident angle of the at least one light source, obtaining a direction of the at least one light source based on the incident angle, determining that a plurality of incident rays of light from the at least one light source intersect with each other, and obtaining the position of the at least one light source as an interaction point of the plurality of incident rays of light from the at least one light source.

The obtaining the brightness of the at least one light source based on the position of the light source may include obtaining an actual brightness of the at least one light source based on the 3D map of the scene and the position of the at least one light source, and obtaining a target brightness of the at least one light source based on the actual brightness of the at least one light source.

The obtaining the actual brightness of the at least one light source based on the 3D map of the scene and the position of the at least one light source may include obtaining a light intensity for each of the plurality of video frames based on the 3D map, the plurality of video frames, and the position of the at least one light source, and obtaining the actual brightness based on an average of the light intensities for each of the plurality of video frames.

The obtaining the target brightness of the at least one light source may include obtaining a trend of frame brightness from each of the plurality of video frames based on the actual brightness, obtaining a Fourier transform of the frame brightness for each of the plurality of video frames, excluding frames having frequencies of 100 hz and 120 hz, and obtaining the target brightness of the at least one light source as an inverse Fourier transform of the remaining frames.

The obtaining the de-flickering factor may include obtaining an angle based de-flickering factor based on the 3D map of the scene, the position of the at least one light source, an actual brightness of the at least one light source, and a target brightness of the at least one light source, wherein the angle based de-flickering factor is a matrix of numbers added to a frame to remove flicker, obtaining an artificial intelligence (AI) based de-flickering factor based on the plurality of video frames, combining the angle based de-flickering factor and the AI based de-flickering factor, and obtaining the de-flickering based on the angle based de-flickering factor and the AI based de-flickering factor, wherein the angle based de-flickering factor is multiplied with the AI based de-flickering factor to obtain the de-flickering factor.

The obtaining the angle based de-flickering factor may include obtaining an incident angle towards the at least one light source, obtaining a cosine of the incident angle, obtaining an average of the cosine for each pixel in the plurality of video frames, and obtaining the angle based de-flickering factor as a combination of the average of the cosine, the target brightness of the at least one light source, and the actual brightness of the at least one light source, wherein the angle based de-flickering factor is a value obtained for each pixel and added to each pixel for removing the flicker.

The obtaining the AI based de-flickering factor may include sending the plurality of RGB video frames as an input to an AI model, and receiving the AI based de-flickering factor from the AI model based on the input.

The applying the de-flickering factor to each of the plurality of video frames to remove the flicker may include adjusting each pixel in the plurality of RGB video frames based on an angle between the surface normal and the light source, adding a light intensity with the resultant de-flickering factor to obtain de-flickered light intensities, and multiplying the de-flickered light intensity with the cosine to obtain frames without flicker.

According to another aspect of an embodiment, there is provided an electronic device for removing flicker from a video, the electronic device including a memory, a camera, and at least one processor coupled to the memory and the camera, wherein the at least one processor is configured to obtain a plurality of red-green-blue (RGB) video frames of a scene in a field of preview of the camera, obtain a position of at least one light source in the plurality of video frames, obtain a brightness of the at least one light source based on the position of the light source, obtain a de-flickering factor for each pixel in the plurality of video frames based on the position of the at least one light source and the brightness of the at least one light source, and apply the de-flickering factor to each of the plurality of video frames to remove the flicker.

To obtain the position of at least one light source in the plurality of video frames, the at least one processor may be further configured to identify at least one region of a maximum brightness in the plurality of video frames as a bright cluster, obtain a three dimensional (3-D) map of the scene based on a depth map of the scene, and obtain the position of the at least one light source based on the identified bright cluster and the 3D map of the scene.

To obtain the position of the at least one light source based on the bright cluster and the 3D map, the at least one processor may be further configured to obtain a surface perpendicular and an angle of reflection of the at least one light source, obtain an incident angle of the at least one light source, obtain a direction of the at least one light source based on the incident angle, determine that a plurality of incident rays of light from the at least one light source intersect with each other, and obtain the position of the at least one light source as an interaction point of the plurality of incident rays of light from the at least one light source.

To obtain the brightness of the at least one light source based on the position of the light source, the at least one processor may be further configured to obtain an actual brightness of the at least one light source based on the 3D map of the scene and the position of the at least one light source, and obtain a target brightness of the at least one light source based on the actual brightness of the at least one light source.

To obtain the actual brightness of the at least one light source based on the 3D map of the scene and the position of the at least one light source, the at least one processor may be further configured to obtain a light intensity for each of the plurality of video frames based on the 3D map, the plurality of video frames and the position of the at least one light source, and obtain the actual brightness based on an average of the light intensities for each of the plurality of video frames.

To obtain the target brightness of the at least one light source, the at least one processor may be further configured to obtain a trend of frame brightness from each the plurality of video frames based on the actual brightness, obtain a Fourier transform of the frame brightness for each of the plurality of video frames, exclude frames having frequencies of 100 hz and 120 hz, and obtain the target brightness of the at least one light source as an inverse Fourier transform of the remaining frames.

To obtaining the de-flickering factor, the at least one processor may be further configured to obtain an angle based de-flickering factor based on the 3D map of the scene, the position of the at least one light source, an actual brightness of the at least one light source, and a target brightness of the at least one light source, wherein the angle based de-flickering factor is a matrix of numbers added to a frame to remove flicker, obtain an artificial intelligence (AI) based de-flickering factor based on the plurality of video frames, combine the angle based de-flickering factor and the AI based de-flickering factor, and obtain the de-flickering based on the e angle based de-flickering factor and the AI based de-flickering factor, wherein the angle based de-flickering factor is multiplied with the AI based de-flickering factor for obtaining the de-flickering factor.

To obtain the angle based de-flickering factor, the at least one processor may be further configured to obtain an incident angle towards the at least one light source, obtain a cosine of the incident angle, obtain an average of the cosine for each pixel in the plurality of video frames, and obtain, the angle based de-flickering factor as a combination of the average of the cosine, the target brightness of the at least one light source and the actual brightness of the at least one light source, wherein the angle based de-flickering factor is a value obtained for each pixel and added each pixel for removing the flicker.

To obtain the AI based de-flickering factor, the at least one processor may be further configured to send the plurality of RGB video frames as an input to an AI model, and receive the AI based de-flickering factor from the AI model based on the input.

To apply the de-flickering factor to each of the plurality of video frames to remove the flicker, the at least one processor may be further configured to adjust each pixel in the plurality of RGB video frames based on an angle between the surface normal and the light source, add a light intensity with the resultant de-flickering factor to obtain de-flickered light intensities, and multiply the de-flickered light intensity with the cosine to obtain frames without flicker.

BRIEF DESCRIPTION OF THE DRAWINGS

The embodiments herein will be better understood from the following description with reference to the drawings, in which.

DETAILED DESCRIPTION OF INVENTION

Figure 1:
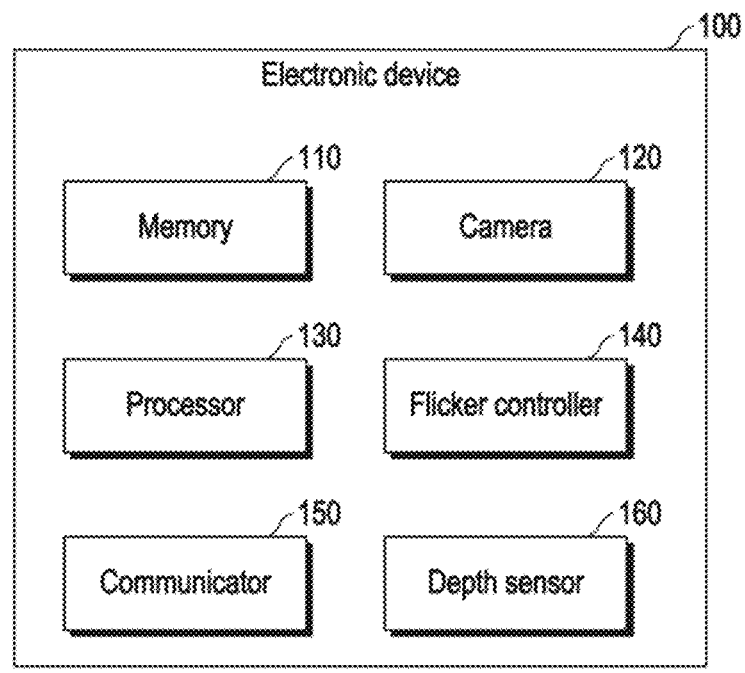
FIG. 1 illustrates a block diagram of a user equipment (UE) (100) for removing a flicker in a slow motion video, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. In addition, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The method according to embodiments disclose removing flicker in a slow-motion video. First the red-green-blue (RGB) frames are fetched from the slow-motion video. Further, regions of spectral reflections, surfaces from which light from source directly reflects towards the camera, are determined, for obtaining position of the light sources. Further, a three dimensional (3D) map of the scene is obtained. The position of the light source is then determined using the 3D map and the spectral reflections.

An actual brightness and target brightness of the light source on the scene is determined. Further, an angle based and an artificial intelligence (AI) based de-flickering factor is determined. Using the angle based and the AI based de-flickering factor, a resultant de-flickering factor is obtained.

Finally, the resultant de-flickering factor is applied on original frames to obtain flicker free slow-motion video.

Referring now to the drawings, and more particularly to FIGS. 1 through 11, there are shown embodiments.

FIG. 1 illustrates a block diagram of a user equipment (UE) (100) for removing a flicker in a slow motion video, according to an embodiment.

Examples of the UE (100) include, but are not limited to, a smartphone, a tablet computer, a personal digital assistance (PDA), an Internet of Things (IoT) device, a wearable device, etc. Furthermore, the UE (100) includes a memory (110), a camera (120), a processor (130), a flicker controller (140), a communicator (150) and a depth sensor (160).

In an embodiment, the method and device according to embodiments remove the flicker while the camera (120) is capturing the slow-motion video. The device is explained in detail below.

In an embodiment, the memory (110) is configured to store a depth map of the scene, a plurality of RGB video frames and a 3D map of the scene. The memory (110) stores instructions to be executed by the processor (130). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) may be configured to store larger amounts of information than the memory. In certain examples, a non-transitory storage medium may store data that may, over time, change (e.g., in random access memory (RAM) or cache). The memory (110) may be an internal storage unit or may be an external storage unit of the UE (100), a cloud storage, or any other type of external storage.

The camera (120) is configured to capture the scene in form of a video or an image. The video may be a slow-motion video.

The processor (130) communicates with the memory (110), the camera (120), the flicker controller (1430), the communicator (150), and the depth sensor (160). The processor (130) is configured to execute instructions stored in the memory (110) and to perform various processes. The processor (130) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (150) is configured for communicating internally between internal hardware components and with external devices (e.g. camera, depth sensor, flicker controller, etc.). The communicator (150) includes an electronic circuit specific to a standard that enables wired or wireless communication.

The depth sensor (160) is configured for creating a depth map of the video/image of the scene. In an embodiment, the depth sensor determines a depth of the video and further creates the depth map from the depth video using image processing.

The flicker controller (140) determines a de-flickering factor and applies the de-flickering factor on the scene for removing the flicker.

The flicker controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The flicker controller (140) and the processor (130) may be referred to as 'at least one processor', collectively.

In an embodiment, the flicker controller (140) obtains RGB video frames from the slow-motion camera using image processing. In another embodiment, the flicker controller (140), obtains an optimal bright region, which is an actual bright region, based on a dynamic threshold. In an embodiment, for example, a top 10 percentile of pixels from a number of pixels in the plurality of vide frames are considered as bright pixels. Further, a small clusters, for example, less than 2% of the image area or isolated bright pixels may be not considered. The remaining regions are considered as bright regions and all the points present in the bright regions are considered as bright points or bright clusters.

Further, the flicker controller (140), creates a 3D map of the scene based on the plurality of RGB video frames and the depth map. After creating the 3D map, the flicker controller (140) determines the different light sources illuminating the scene. In an embodiment, the flicker controller (140) determines a direction and a position of the light sources based on the 3D map and the identified bright clusters.

Further, flicker controller (140) determines an actual brightness of the light source and the target brightness of the light source. The actual brightness of the light source may be a luminosity of the light source, whereas the target brightness of the light source may be the luminosity of the light source without the flicker. The actual brightness of the light source is determined based on the 3D map, the position of the light source and the plurality of RGB video frames. The target brightness of the light source is determined based on the actual brightness.

After determining, the actual brightness and the target brightness, the flicker controller (140) determines an angle based de-flickering factor. The angle based de-flickering factor is determined based on the 3D map, the position of the light source, the actual brightness and the target brightness.

Further, the flicker controller (140) combines the angle based de-flickering factor with an AI based de-flickering factor to obtain a resultant de-flickering factor.

The flicker controller (140) then applies the resultant de-flickering factor on each frame in the RGB video frames to obtain a flicker free video.

Thus, as described above, the method and device according to embodiments remove flicker more effectively. As embodiments do not divide the video/image into regions, and the de-flickering factor rather depends on the angle between surface normal and light source, no artifacts are introduced.

Further, the method according to an embodiment takes into consideration a change in object orientation which accounts for brightness change due to change in angle towards light source, and does not apply transformation when a change in brightness is purely due to orientation change and not due to light source luminosity change. Thus, new flicker is not introduced at motion areas in the video.

Further, the embodiment considers a change in pixel brightness and a change in angle between surface perpendiculars of object with light source to calculate a more accurate estimate of light source brightness change. Hence, the embodiment results in a better flicker removal which considers surface geometry.

Although FIG. 1 shows various hardware components of the UE (100), embodiments are not limited thereon. In embodiments, the UE (100) may include less or more number of components. Further, the labels or names of the components are used only for illustrative purpose and is not limiting. One or more components may be combined to perform the same or substantially similar function to remove flicker in the slow motion videos.

Figure 2:
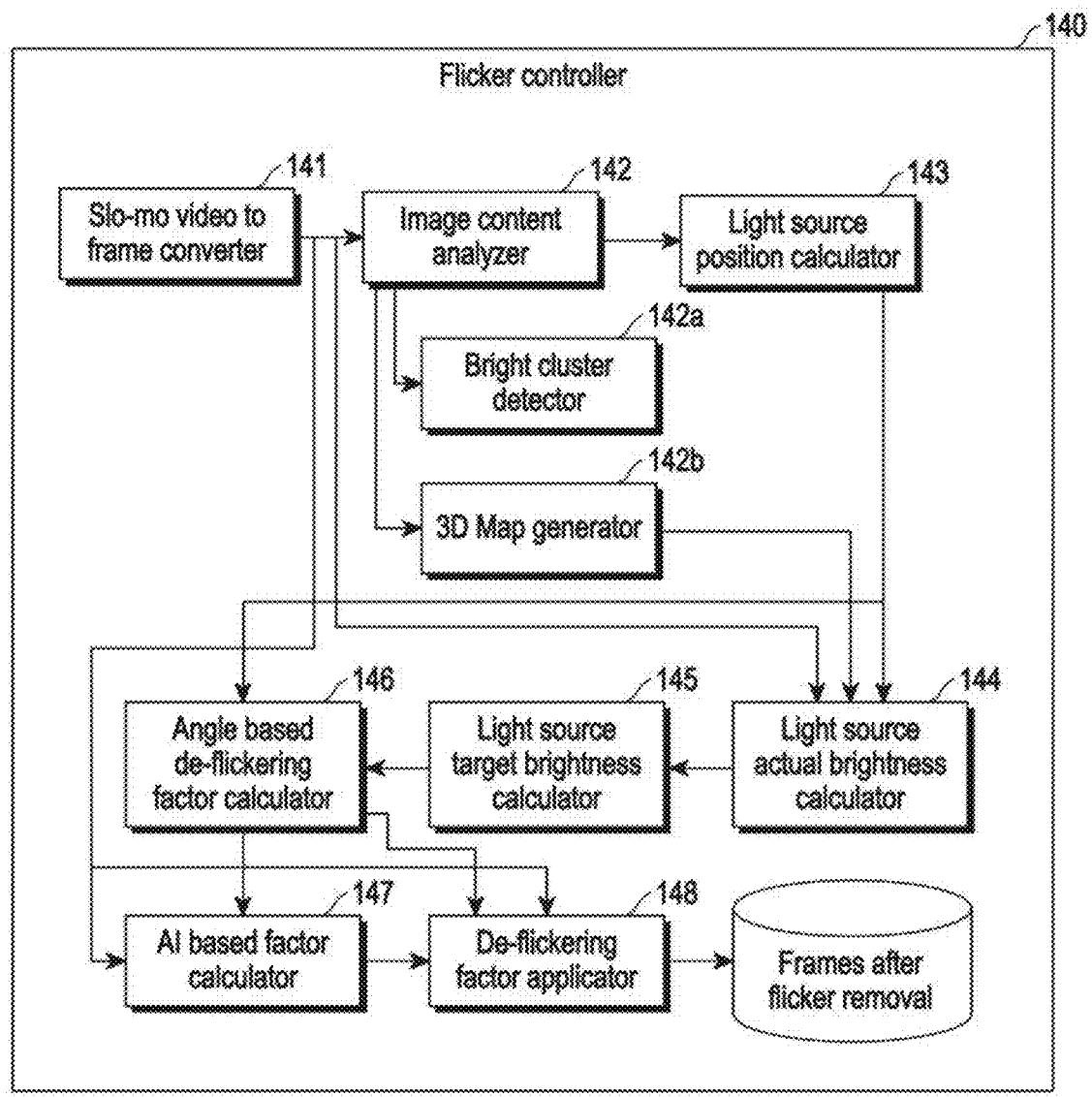
FIG. 2 is a block diagram of the flicker controller (140), illustrating the various units for removing flicker in the slow-motion video, according to an embodiment.

FIG. 2 is a block diagram of the flicker controller (140) illustrating the various units for removing flicker in the slow-motion video, according to an embodiment.

In an embodiment, the flicker controller (140) comprises a slow-motion video to frame converter (141), an image content analyzer (142), a light source position calculator (143), a light source actual brightness calculator (144), a light source target brightness calculator (145), an angle based de-flickering factor calculator (146), an AI based de-flickering factor calculator (147) and a de-flickering factor applicator (148).

In an embodiment, the blocks (141-148) of the flicker controller are implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the slow motion video to frame convertor (141) obtains RGB video frames from the slow-motion camera using image processing.

The slow-motion camera frames are then passed on to the image content analyzer (142). The image content analyzer (142) comprises a bright cluster determiner (142a) and a 3D map generator (142b). The bright cluster determiner (142a) identifies the bright clusters. The 3D map generator (142b) creates the 3D map of the scene based on the plurality of RGB video frames and the depth map. After creating the 3D map, the light source position calculator (143) determines the position of the light sources based on the 3D map and the identified bright clusters.

Further, the light source actual brightness calculator (144) determines the actual brightness of the light source and the light source actual brightness calculator (145) calculates the target brightness of the light source.

After determining, the angle based de-flickering factor calculator (146) determines the angle based de-flickering factor. The AI based de-flickering factor calculator (147) calculates the AI based de-flickering factor.

Further, the flicker controller (140) combines the angle based de-flickering factor with an AI based de-flickering factor to obtain a resultant de-flickering factor.

The de-flickering factor applicator (148) then applies the resultant de-flickering factor on each frame in the RGB video frames to obtain a flicker free video FIG. 3 is a flow diagram, illustrating a flow for determining the bright cluster, according to an embodiment.

In an embodiment, a brightness threshold is determined. A fixed value of brightness threshold does not work in very dark or light scenes. When a fixed value of brightness is taken as threshold to calculate bright points, a dark scene would have very less (or no) number of bright regions and a light scene would have very high number of bright regions. Thus, to obtain an optimal bright regions (actual bright regions), the method according to an embodiment uses a dynamic threshold such as considering a top 10 percentile of pixels in the plurality of vide frames as bright pixels.

FIG. 3 illustrates an input operation 301. At operation 302, a histogram of the pixels is created. From the histogram, at operation 303, the top 10 percentile of pixels are considered as bright points. Further, at operation 304, the bright points in the top 10 percentile are considered as cluster bright point. At operation 305, the cluster size is compared with a threshold size, wherein the threshold size is 2% of a frame size. When the cluster size is greater than the threshold size, the cluster is considered to be the bright cluster. In another embodiment, when the cluster size is less than the threshold size, the cluster is considered not to be the bright cluster.

Figure 3A:
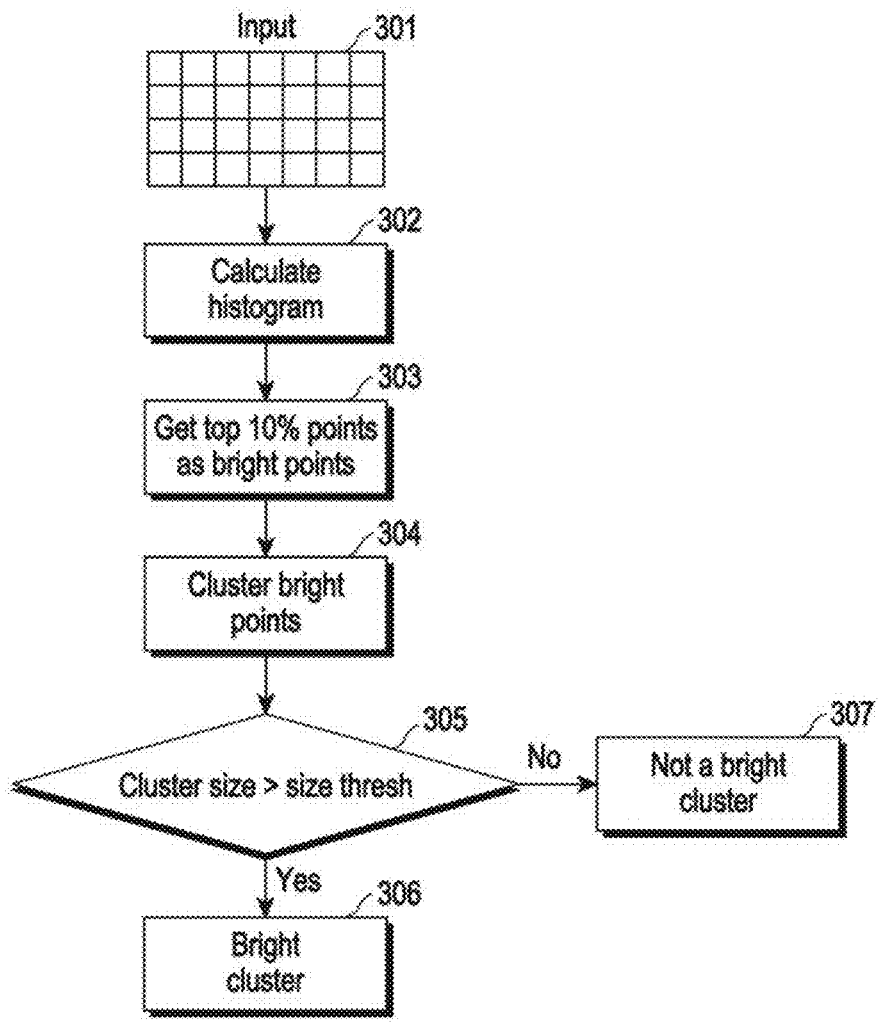
FIG. 3A is a flow diagram illustrating a flow for determining the bright cluster, according to an embodiment.
Figure 3B:
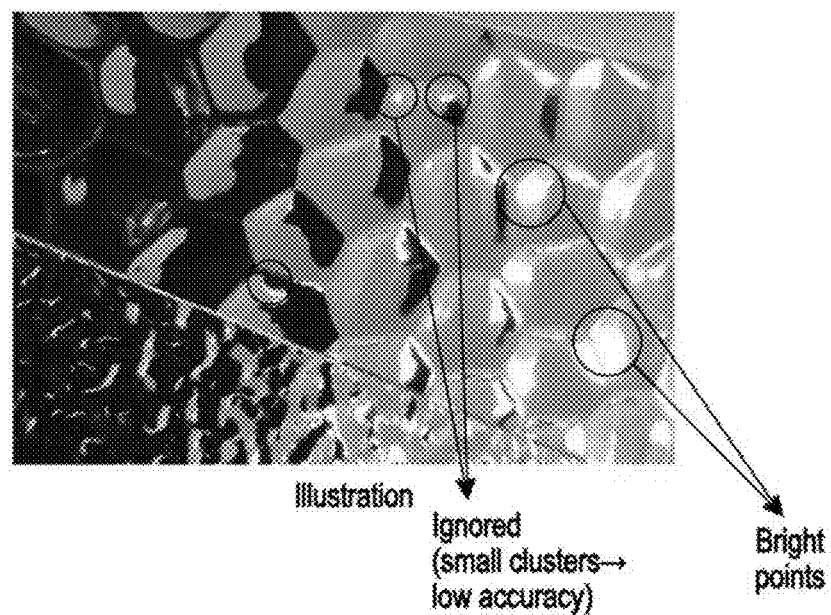
FIG. 3B illustrates the bright regions and the small bright regions.

FIGS. 3A and 3B are schematic diagrams providing example illustrations of the bright cluster, according to an embodiment.

FIG. 3B illustrates the bright regions and the small bright regions (which are not considered). The small regions are formed around sharp edges. Calculation of surface geometry may not be accurate around sharp edges so these regions are ignored due to accuracy concern.

Figure 3C:
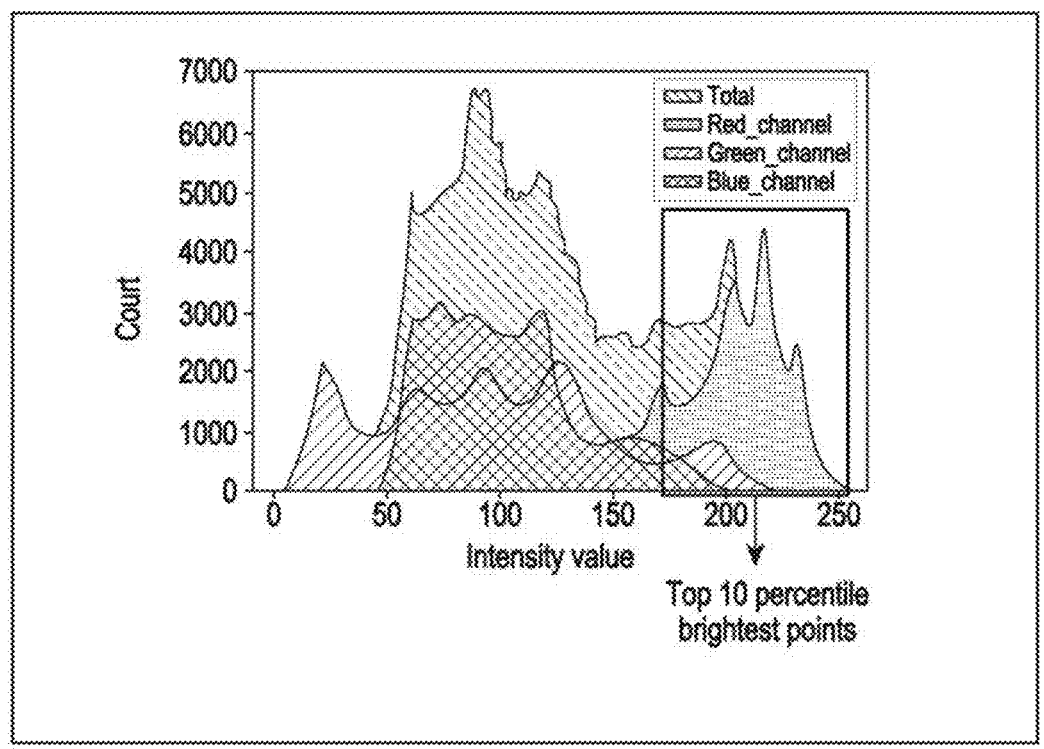
FIG. 3C illustrates the histogram created for any frame at operation 302.

FIG. 3C illustrates the histogram created for any frame at operation 302. As seen in the histogram, the top 10 percentile points are considered as bright points. These top 10 percentile bright points are further clustered to get the bright regions.

Figure 4:
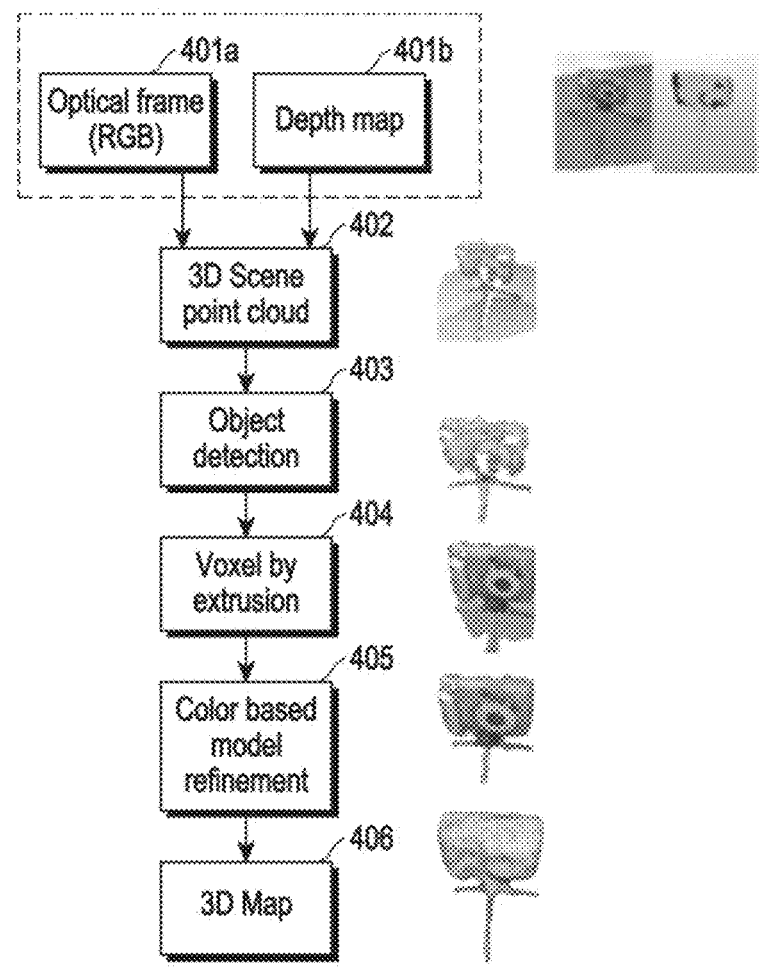
FIG. 4 is a flow diagram illustrating a flow of creating the three-dimensional (3D) map of the scene, according to an embodiment.

FIG. 4 is a flow diagram illustrating a flow of creating the 3D map of the scene, according to an embodiment.

In an embodiment, generating the 3D map of the scene refers to transforming each depth pixel into a 3D point with camera at (0,0,0) as reference frame. FIG. 4 illustrates the RCE video (optical) frame 401a and the depth map of the scene 401b. At operation 402, a 3D scene point cloud is generated. At operation 403, an object in the scene is identified. At operation 404, voxels (3D pixels) are obtained by extrusion. At operation 405, a color based refinement is performed using methods in related art. Finally, at operation 406, the 3D map is obtained. Example figures for each operation are shown besides each block in FIG. 4.

Figure 5A:
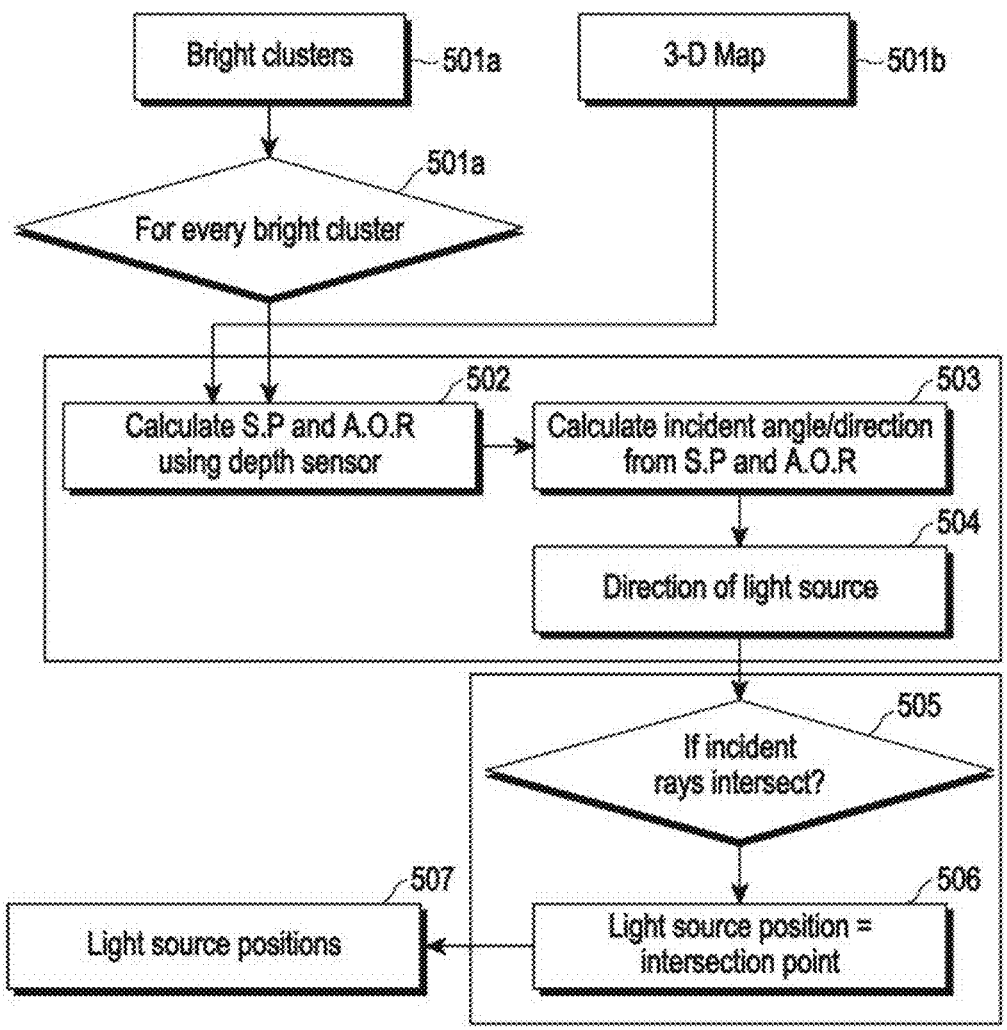
FIG. 5A is a flow diagram illustrating a flow for detecting a position of the light source(s) illuminating in the scene, according to an embodiment.

FIG. 5A is a flow diagram illustrating a flow for detecting a position of the light sources illuminating in the scene, according to an embodiment.

In the embodiment, the position of the light source is determined in order to find an angle between surface normal and light source (cos(θ)) based on angle of pixels with light source. In an embodiment, the bright points represents spectral reflection which is the surface from where the light directly reflects from the source to the camera. Using the property of light where angle of incidence is equal to angle of reflection, the position of the light source is determined.

FIG. 5A illustrates bright clusters 501a and a 3D map 501b being provided as an input. At operation 502, surface perpendiculars (SP) and angle of reflection (AOR) is calculated for each bright cluster identified using the depth Sensor (160). At operation 503, an incident angle or a direction from the SP and the AOR is calculated. At operation 504, based on the incident angle, the direction of the light source is calculated. Further, at operation 505, the method comprises determining whether rays from the light source incident on the surface intersect each other. In an embodiment, when the incident rays intersect, then an intersection point of the incident rays is determined to be the light source position.

Figure 5B:
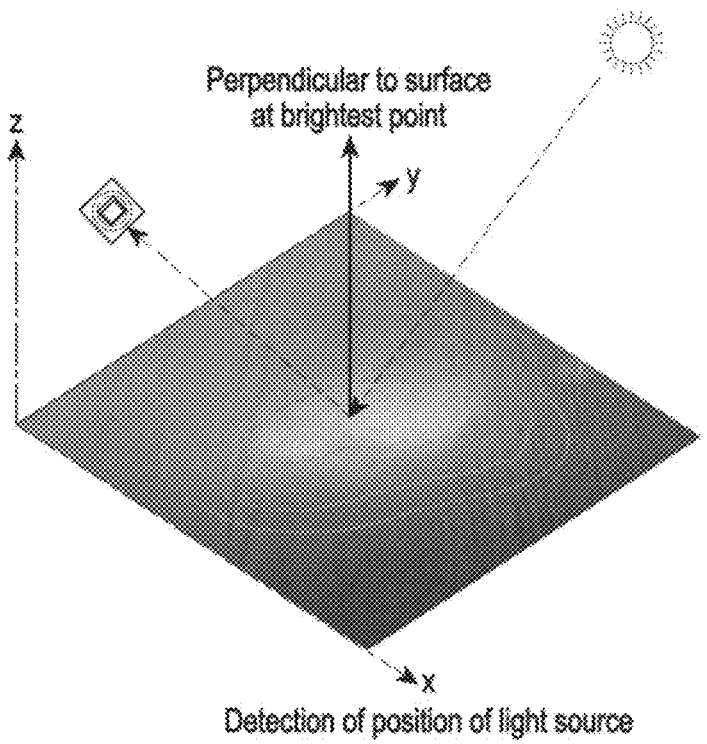
FIGS. 5B and 5C explain the detecting the direction of the light source, according to an embodiment.

FIG. 5B illustrates the detecting the direction of the light source, according to an embodiment. FIG. 5B illustrates a light source 1, which may be the Sun. The scene is captured by the camera (120). In an embodiment, a slow-motion video may be the input. Each single frame is analyzed and a surface orientation is determined and the luminosity of the image is enhanced.

Further, regions with same luminosity are clustered and a normal is drawn at the surface and on a point where the luminosity is maximum. Further, based on the point where the normal is drawn, the angle of incidence and the angle of reflection, direction of light source in space is determined.

Figure 5C:
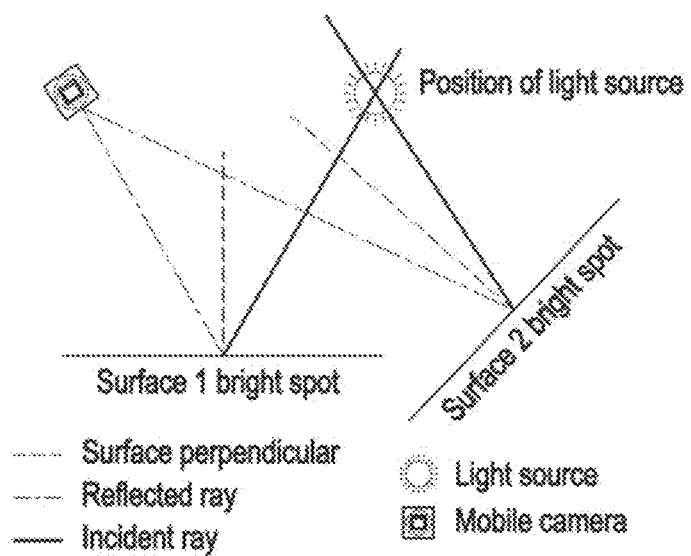

The method is explained in detailed with FIG. 5C, according to an embodiment. As seen in FIG. 5C, from the point cloud, a normal vector at the bright points is determined. The point clouds are a collection of points on the surface on which a time of flight (TOF) sensor has detected the distance of the surface from the ToF sensor.

Further, as the camera is the position (0,0,0), a vector from the point at the surface to the camera is considered and termed as a camera vector. Using these two vectors (normal vector and camera vector), a line on which the light source is present is determined. For example, the line is represented as a light source vector. The intersecting points of two light source vectors represent the positioning of light source.

Figure 6A:
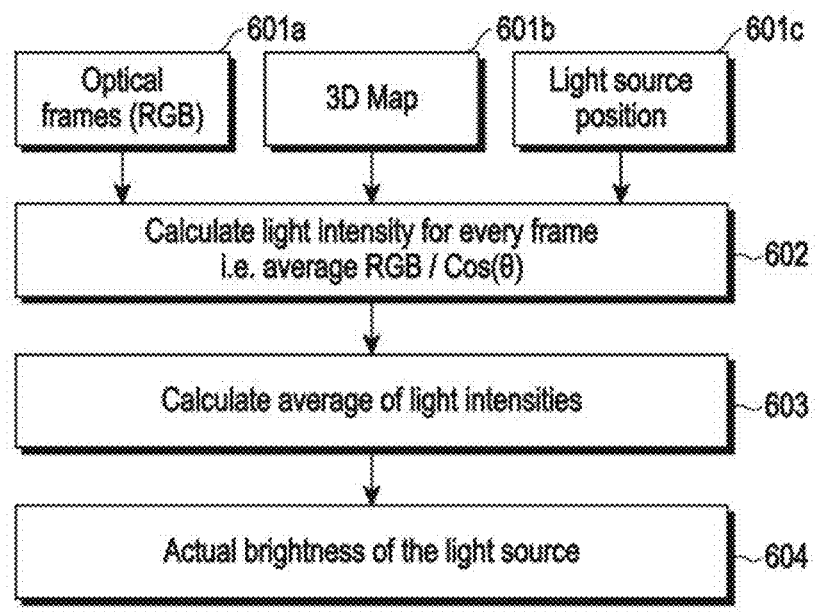
FIG. 6A is a schematic diagram illustrating a flow for determining the actual brightness of the light source, according to an embodiment.

FIG. 6A is a schematic diagram illustrating a flow for determining the actual brightness of the light source, according to an embodiment.

In an embodiment, the fluctuation in a currently viewed scene is detected with respect to previous scenes. A change in the orientation of a surface/object changes the amount of light incident on the surface which further changes how the surface appears in the frame. The change in the amount of light incident on the surface needs to be considered. When the change is not considered, then the change in the orientation of the object is detected as change in brightness of the light source thereby introducing flicker, as in related arts.

The method according to an embodiment discloses calculating the light intensity for each frame from the plurality of RGB video frames. In an embodiment, the light intensity is calculated by taking an average RGB of all the frame divided by Cos(θ), as seen at operation 602.

At operation 603, the frame brightness is determined as an average of the light intensities determined at operation 602. Further, based on a pattern of the average of the light intensities, a frequency of luminosity is deducted.

The brightness of a pixel (p) is given by Equation 1 below.

$$I*Cos(\theta)$$

$$I \alpha \text{ pixel brightness}(p)/\cos(\theta) \qquad \text{Equation 1}$$

Here, I denotes intensity of the light source, θ denotes an angle between surface normal and light source, I denotes mean (p/cos(θ)), p denotes pixel values, and θ denotes an angle.

Figure 6B:
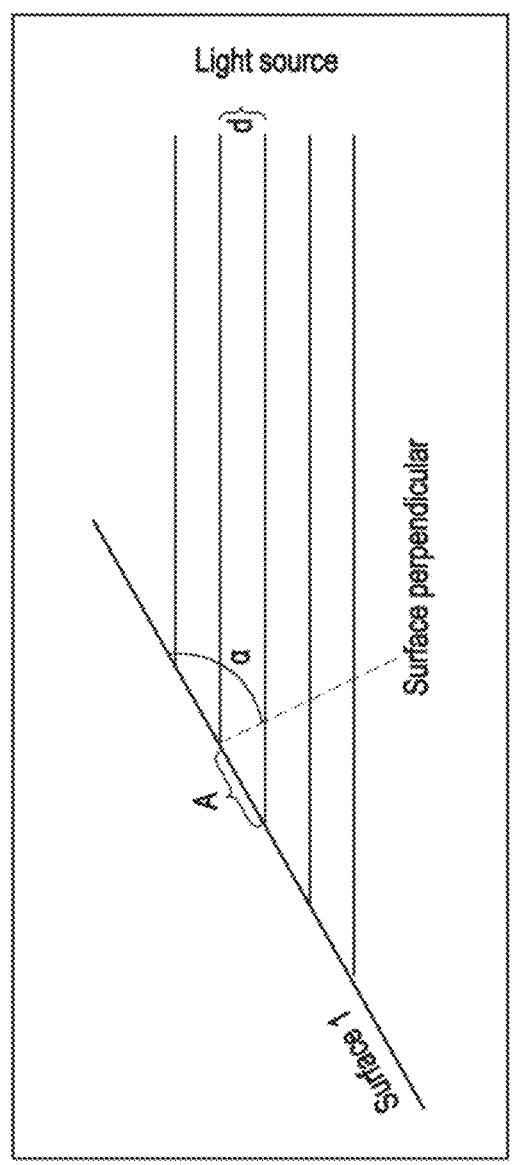
FIGS. 6B and 6C are schematic diagrams illustrating changes in luminosity due to change in the angle of surface towards the light source, according to an embodiment.
Figure 6C:
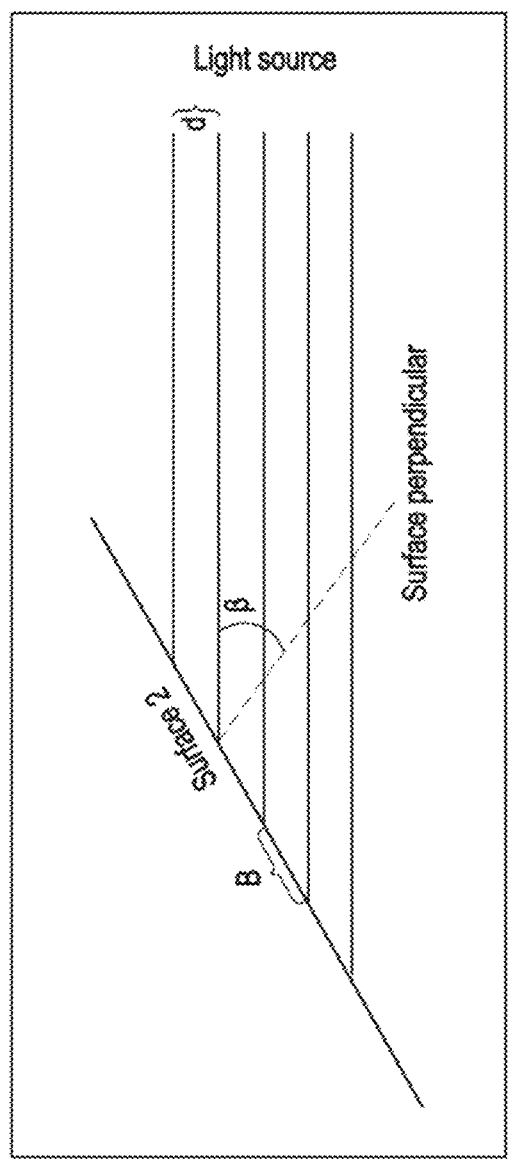

FIGS. 6B and 6C are schematic diagrams illustrating changes in luminosity due to change in the angle of surface towards the light source, according to an embodiment.

As seen in FIG. 6B, a is an angle of surface 1 towards light source, A is an area on which unit light is incident on the surface 1, and d is an area on which unit light is incident when the surface 1 is directly facing towards light source. Further in FIG. 6C, β is an angle of surface 2 towards light source, B is the area on which unit light is incident on the surface 2, and d is an area on which unit light is incident when the surface is directly facing towards light source.

As seen in FIGS. 6B and 6C, as the angle between surface perpendicular and light source increases, the light coming from the light source spreads widely on the surface. Accordingly, a particular area receives less light and appears less bright compared to the surface directly facing the light source. FIGS. 6B and 6C illustrate tow surfaces with different perpendicular angle towards the light source.

$$A = d/\cos(\alpha) \qquad \text{Equation 2}$$

$$B = d/\cos(\beta) \qquad \text{Equation 3}$$

As seen in Equations 2 and 3, the surface brightness is proportional to amount of light/surface area (A). Accordingly, surface brightness depends on the angle of the surface towards light source.

Thus, the actual brightness in the scene is detected as describe above.

Figure 7A:
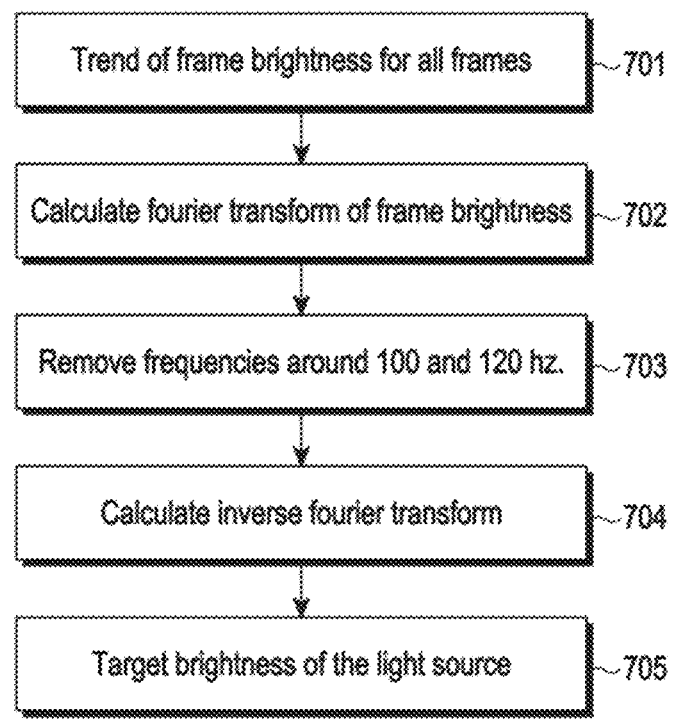
FIG. 7A is a flow diagram illustrating a method of determining the target brightness from the actual brightness, according to an embodiment.

FIG. 7A is a flow diagram illustrating a method of determining the target brightness from the actual brightness, according to an embodiment.

As seen in FIG. 7A, at operation 701, a trend of the actual frame brightness for all frames is determined, wherein the trend is a series of measurements of the actual frame brightness. Further, at operation 702, a Fourier transform of the actual frame brightness is calculated to remove slow-motion flickering frequencies (for example, 100 hz and 120 hz). At operation 703, from all the frequencies in the slow-motion video, 100 hz and 120 hz frequencies are removed, as these specific frequencies results flicker in slow motion video. Further, at operation 704, an inverse Fourier transform of remaining frequencies is calculated to obtain a trend of the target brightness of the frames. Thus the target brightness is calculated using the above method.

Figure 7B:
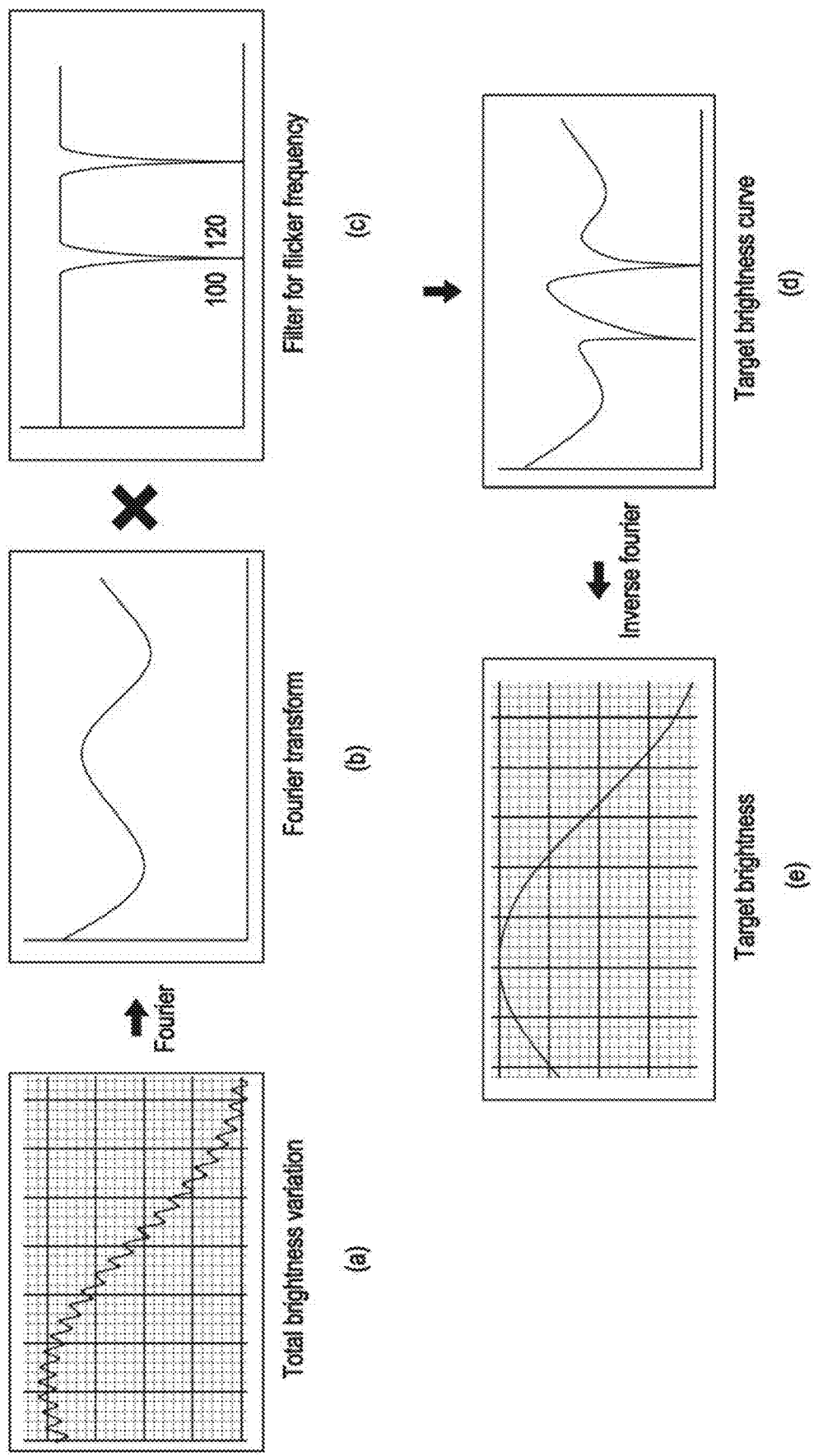
FIG. 7B illustrates schematic diagrams illustrating example of determining the target brightness from the actual brightness, according to an embodiment.

FIG. 7B illustrates schematic diagrams illustrating example of determining the target brightness from the actual brightness, according to an embodiment.

In FIG. 7B, 701' indicates a total brightness variation in an original video. 702' indicates Fourier transform of total brightness variation. 703' indicates removal of the flicker frequencies (100 hz and 120 hz) from the brightness variation by using a band pass filter. 704' indicates the target brightness curve after filtering out flicker frequency and 705' shows target brightness corresponding to brightness variation non-flickering components after performing the inverse Fourier transform.

Figure 8A:
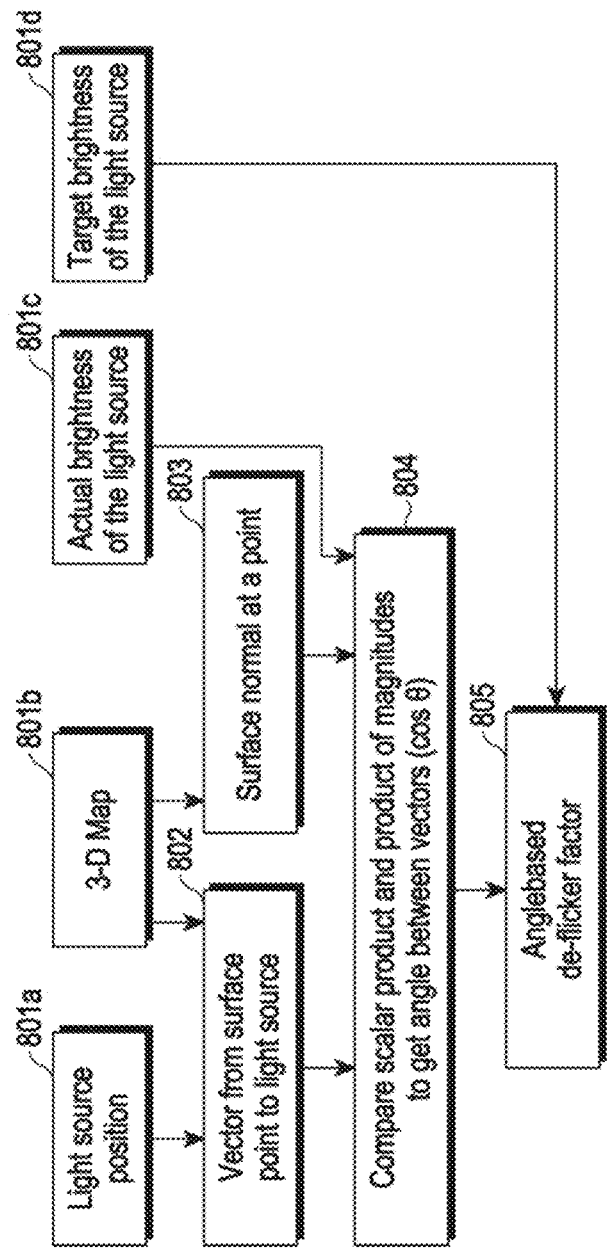
FIG. 8A is a flow diagram illustrating the method flow for determining the angle based de-flickering factor, according to an embodiment.

FIG. 8A is a flow diagram illustrating the method flow for determining the angle based de-flickering factor, according to an embodiment.

FIG. 8A illustrates the position of the light source 801a, the 3D map of the scene 801b, the actual rightness of the light source 801c, and the target brightness of the light source 801d which are inputs for determining the angle based de-flickering factor.

At operation 802, the vector from surface point to the light source is obtained. At operation 803, the surface normal is obtained. At operation 804, a scalar product and a product of magnitudes of the vector from surface point to the light source and the surface normal at a point is compared to get an angle between the vectors.

At operation 805, the angle based de-flickering factor is calculated.

Figure 8B:
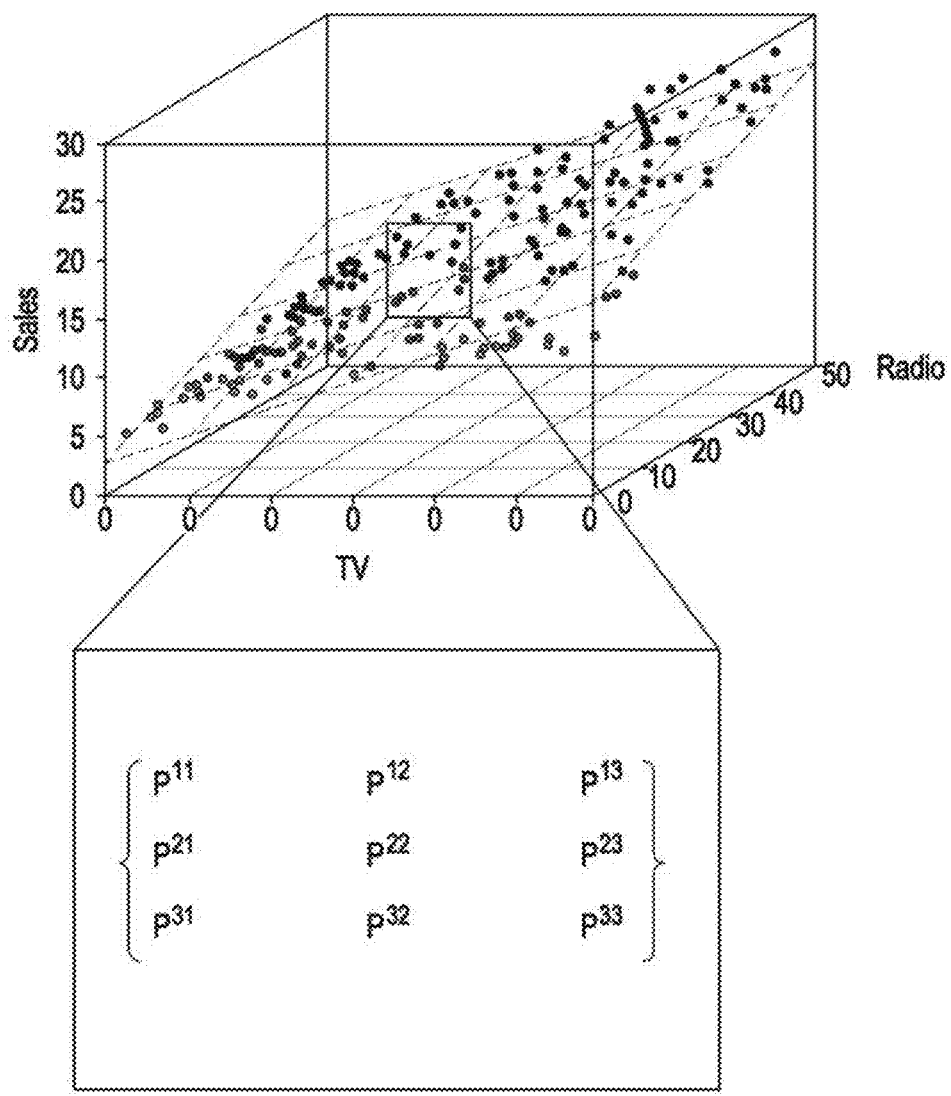
FIG. 8B illustrates and example scenario for calculating the vector from surface point to the light source, according to an embodiment.

FIG. 8B illustrates and example scenario for calculating the vector from surface point to the light source, according to an embodiment.

The surface is s is illustrated in FIG. 8B. For every point in the points cloud, the direction of the surface normal is determined, by comparing a position of adjacent points.

In an embodiment, when the surface is of the form z=f(x,y) and forms the point cloud, then the surface normal is determined by comparing the position of adjacent points in the points cloud as shown in Equation 4.

$$\text{Surface Normal: } n = (-df/dx, -df/dy, 1) \qquad \text{Equation 4}$$

As seen in FIG. 8B, a block indicates the cloud with different cloud points in a 3D space. In the 3D space, the surface normal at point $p_{22}$ is given by Equations 5 and 6.

$$n = (-dp22/dx, -dp22/dy, 1) \qquad \text{Equation 5}$$

$$n = (-(pz23-pz21)/(px23-px21), -(pz32-pz12)/(py32-py12), 1) \qquad \text{Equation. 6}$$

Figure 8C:
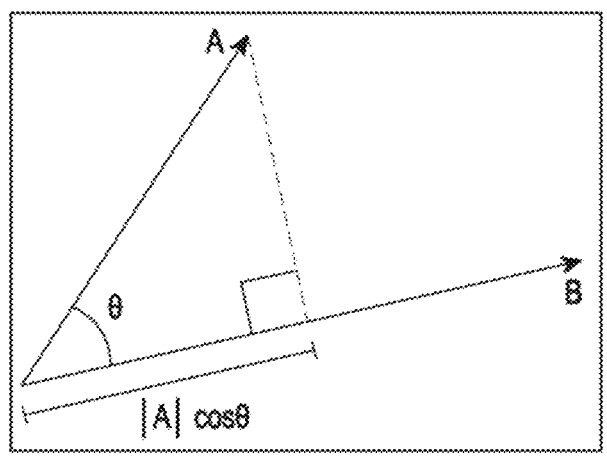
FIG. 8C is a schematic diagram illustrating two vector and an angle between the two vectors used for determining the angle based de-flickering factor, according to an embodiment.

FIG. 8C is a schematic diagram illustrating two vector and an angle between the two vectors used for determining the angle based de-flickering factor, according to an embodiment.

As seen in FIG. 8C, a and b be two vectors, $\vec{a}$=(ax, ay, az), and $\vec{b}$=(bx, by, bz). A dot product is determined between the two vectors to find the angle between these vectors, as the dot product gives a scalar value.

$$\vec{a} \cdot \vec{b} = |a||b| \cos(\theta) = axbx + ayby + azbz$$

$$|a| = \sqrt{ax2 + ay2 + az2}$$

$$|b| = \sqrt{bx2 + by2 + bz2}$$

The angle cos(θ) is calculated from |a|, |b| and $\vec{a} \cdot \vec{b}$ as shown in Equation 7.

$$Cos(\theta) = \vec{a}.\vec{b}/|a||b| = \frac{(axbx + ayby + azbz)}{\sqrt{ax2 + ay2 + az2} * \sqrt{bx2 + by2 + bz2}} \quad \text{Equation 7}$$

Further, to calculate angle based de-flickering factor, the current brightness of the frame is matched to its target brightness. The change is distributed proportional to its angle towards the light source. For each pixel, Bp is calculated, which is the value to be added in current pixel to remove flicker. Bp is given by Equation 8.

$$Bp = (T-C)\cos(\theta)/A \quad \text{Equation 8.}$$

Here, Bp denotes the value to be added in current pixel to remove flicker, T denotes the target brightness of the light source, C denotes the actual brightness of the light source, and A denotes an average of cos(θ) for every pixel. Further, the AI based de-flickering is combined with an angle based de-flickering factor to remove flicker.

Figure 9A:
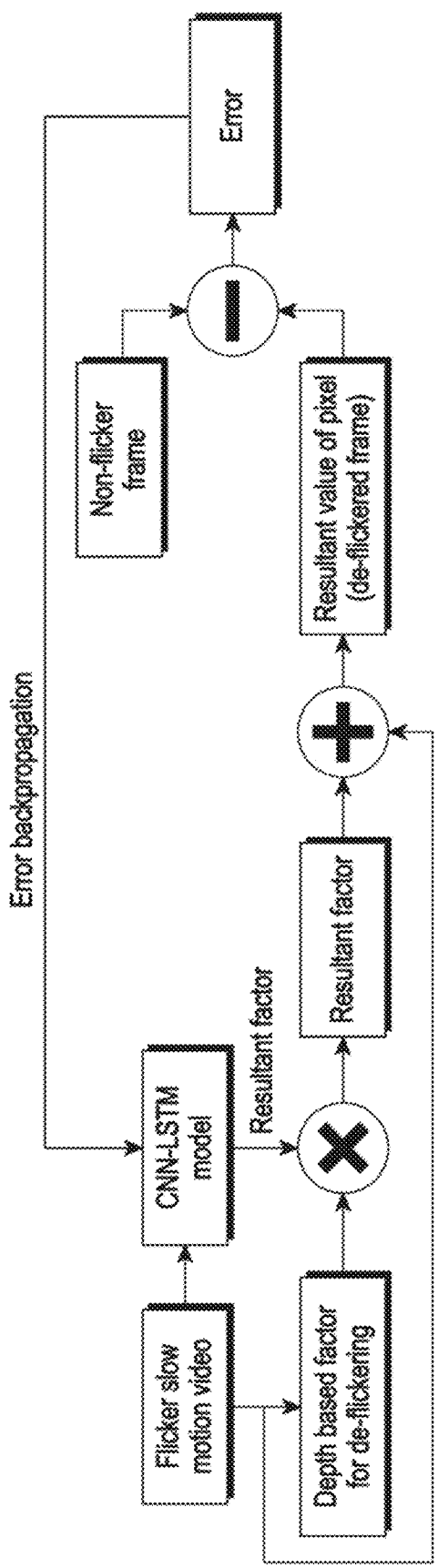
FIGS. 9A and 9B are block diagrams illustrating a training phase and an inference phase of a CNN-LSTM model for determining the artificial intelligence (AI) based de-flickering factor, according to an embodiment.
Figure 9B:
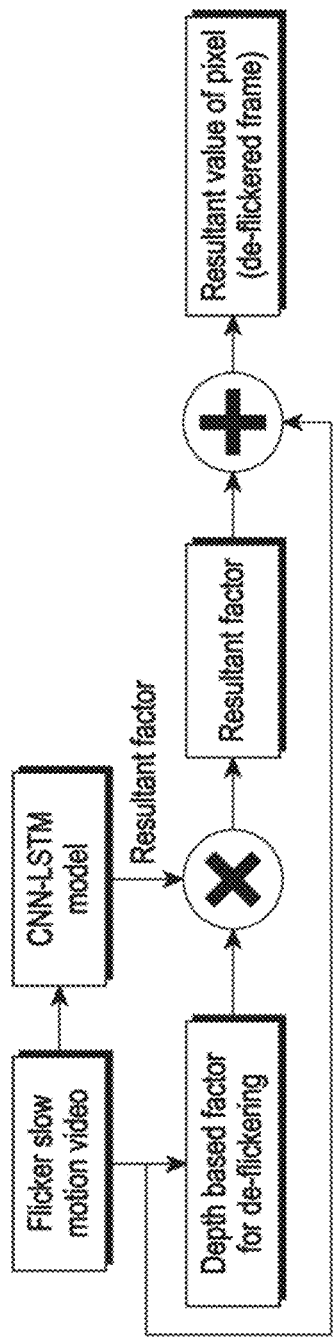

FIGS. 9A and 9B are block diagrams illustrating a training phase and an inference phase of a CNN-LSTM model for determining the AI based de-flickering factor, according to an embodiment.

Although most of the flicker is removed using depth based factor, the depth based factor does not completely remove the flicker. Because depth sensors are not 100% accurate, some errors may propagate through the calculations.

A resolution of depth sensor is lower than resolution of optical sensor. Accordingly some interpolation is required. Many variations such as texture of surface, reflectance of surfaces etc. are considered by an AI based factor which is trained with pairs of flickered and non-flickered videos.

The convolutional neural network (CNN) long short-term memory network (CNN-LSTM) based AI model is used to fine-tune the angle based factor output by calculating the AI based factor, wherein the AI based factor is a matrix of numbers used to scale the angle based de-flickering factor to improve a final result. In an embodiment, the factor normalization is performed to preserve the average target brightness of the frame.

The CNN-LSTM model is trained using a dataset of flicker video and the same video without flicker as seen in FIGS. 9A and 9B.

The operations in FIGS. 9A and 9B are applied on the flickered video and the result is compared to the non-flicker video. The difference is back propagated to the model to obtain model training error. The AI model is trained repetitively until the error is negligible.

Figure 9C:
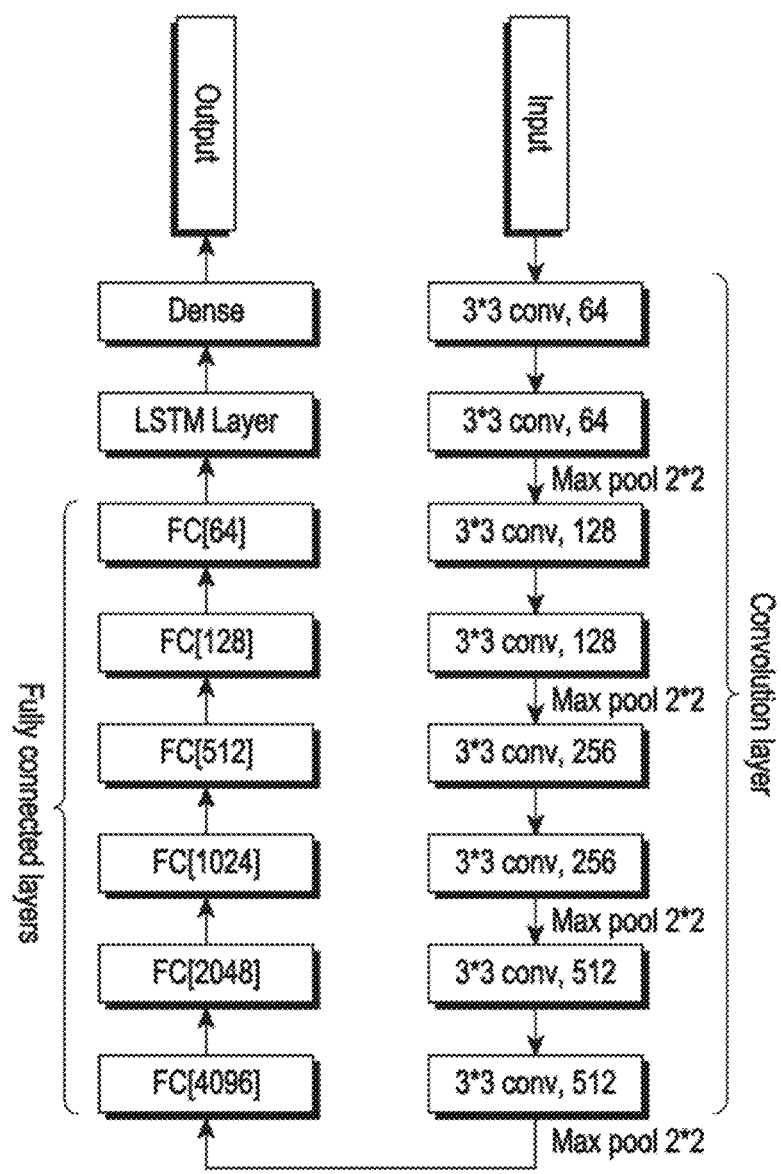
FIG. 9C illustrates an architecture of the CNN-LSTM for determining the AI based de-flickering factor, according to an embodiment.

FIG. 9C illustrates an architecture of the CNN-LSTM for determining the AI based de-flickering factor, according to an embodiment.

As seen in FIG. 9C, a first part of the model (CNN) is used to form an embedding for the frame. The embedding from the CNN model are fed into the second part of the model which is the. LSTM which learns the trends for flicker and non-flicker videos.

The result of LSTM is passed through Dense layer to obtain the AI factor which is used to fine-tune angle based factor.

Figure 9D:
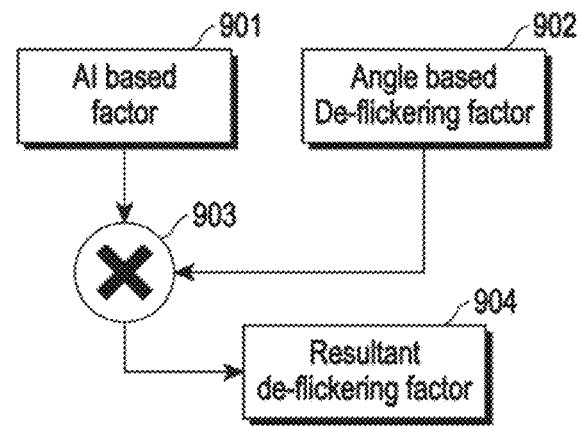
FIG. 9D is a flow diagram for combining the angle based de-flickering factor with the AI based de-flickering factor, according to an embodiment.

FIG. 9D is a flow diagram for combining the angle based de-flickering factor with the AI based de-flickering factor, according to an embodiment.

In an embodiment, the angle based de-flickering factor and the AI based de-flickering factor is combined to calculate the resultant de-flicker factor.

FIG. 9D illustrates the AI based de-flickering factor 901 and the angle based de-flickering factor 902. Further, at operation 903, the AI based de-flickering factor 901 and the angle based de-flickering factor 902 are combined to calculate the resultant de-flicker factor. The resultant de-flickering factor obtained at operation 904 is a corrected matrix of numbers by combining angle based factor and AI factor.

Figure 10:
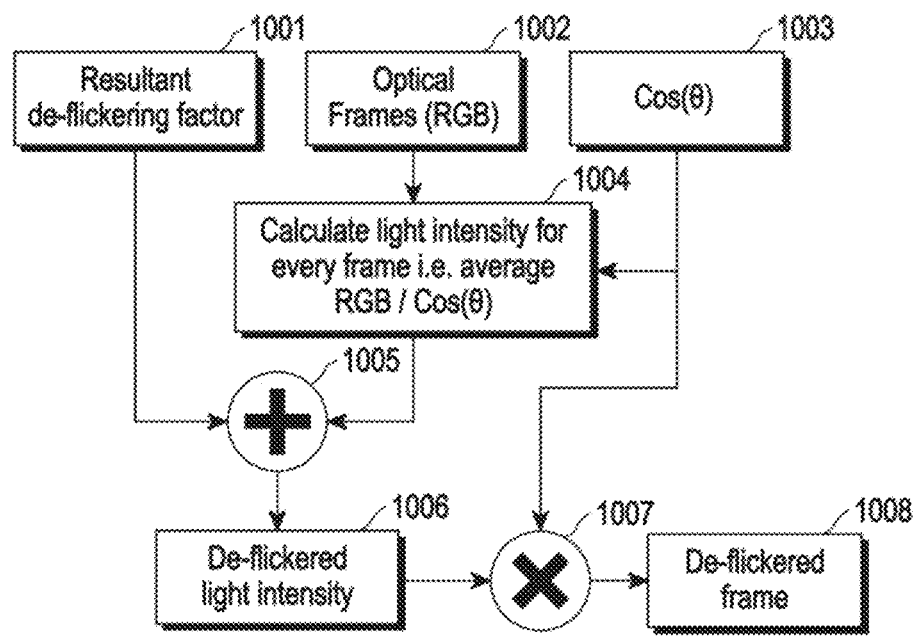
FIG. 10 is a flow diagram illustrating a flow of applying the resultant de-flickering factor for removing the flicker, according to an embodiment.

FIG. 10 is a flow diagram illustrating a flow of applying the resultant de-flickering factor for removing the flicker, according to an embodiment.

The resultant de-flickering factor is applied on an actual flicker frames of the scene. The resultant factor is applied by adjusting each pixel proportional to the angle between surface normal and the light source to match the resultant brightness. The calculated light intensity (averageRGB/Cos (θ)) values are added with the de-flickering factor to get the de-flickered light intensity. The de-flickered light intensity values are multiplied with cos(θ) which results in flicker free frames.

FIG. 10 illustrates the resultant de-flickering factor 1001, the plurality of RGB frames 1002, and the angle cos(θ) 1003. At operation 1004, the light intensity for every frame which is the average RGB/cos(θ) is calculated.

Further, element wise matrix addition of light intensity and resultant de-flickering factor at operation 1005, an element wise matrix addition of light intensity and resultant de-flickering factor is performed. At operation 1006, an element wise matrix multiplication of de-flickering light intensity and cos(θ) is performed. At operation 1007, the de-flickered frames are obtained.

Figure 11A:
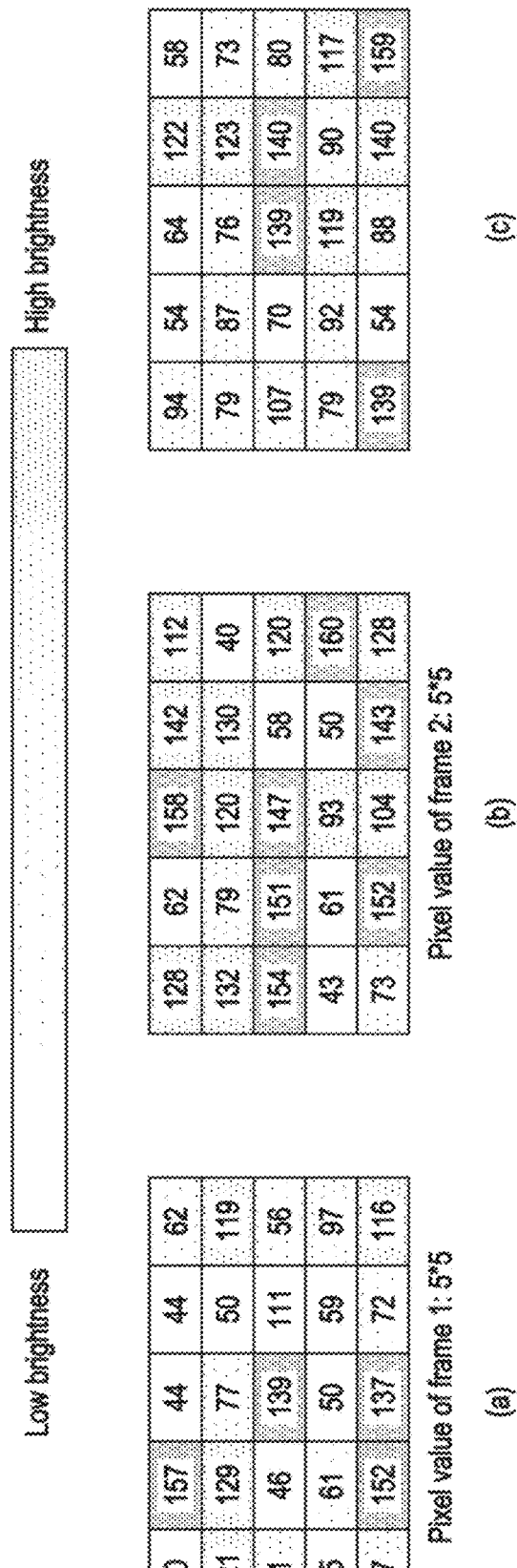
FIGS. 11A through 11U are schematic diagrams illustrating example scenario of flicker removal, according to an embodiment.
Figure 11H:
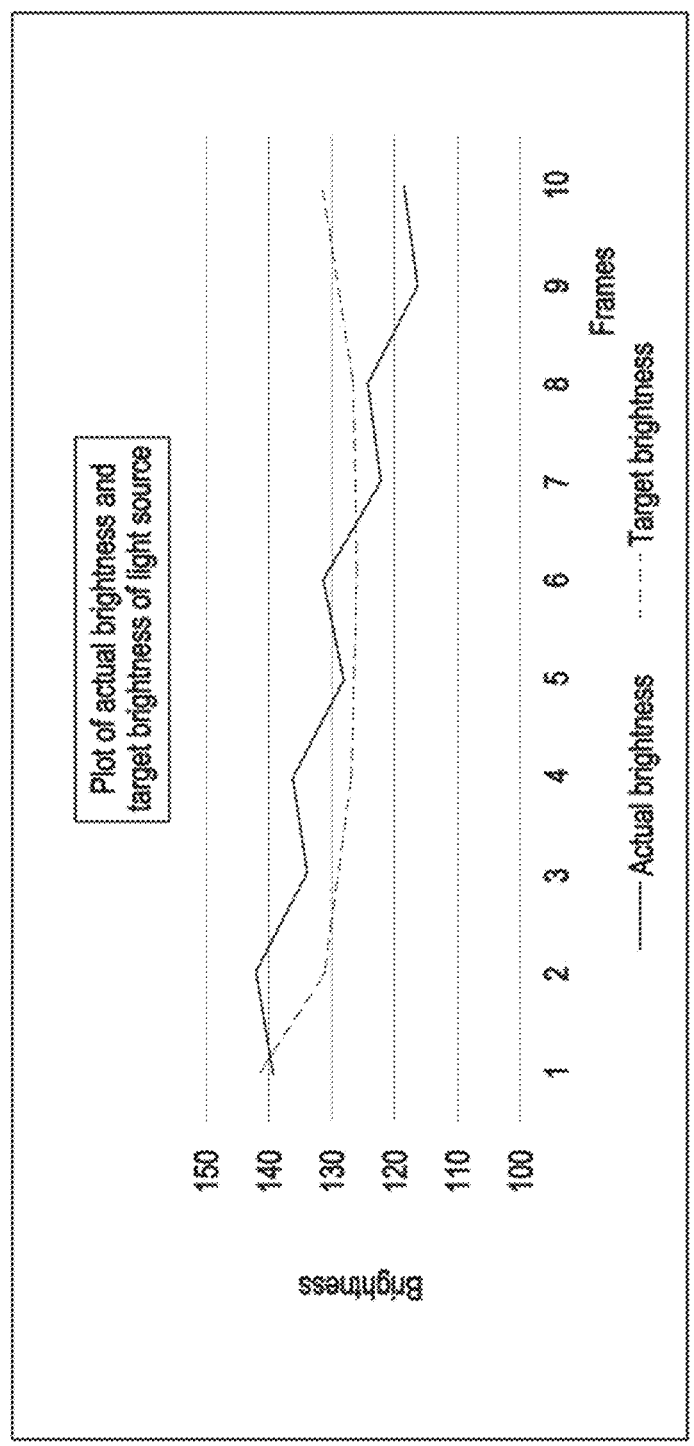
Figure 11U:
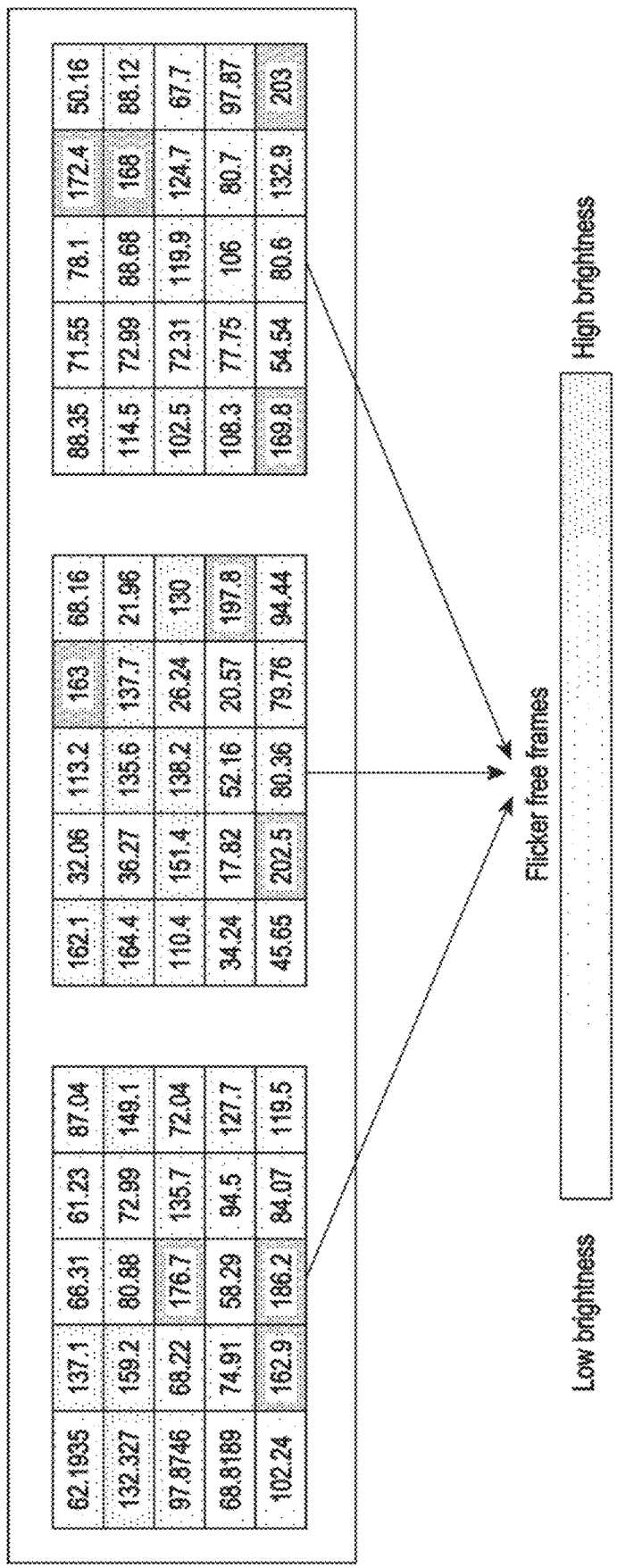

FIGS. 11A through 11U are schematic diagrams illustrating example scenario of flicker removal, according to an embodiment.

In the example, 3 consecutive frames of size 5*5 with the initial values of each pixel for 3 consecutive frames are considered as shown in FIG. 11. For illustration purpose, it is assumed that the position of the light source is known. From the point cloud of the scene and the location of the light source, the angle between surface normal and light source (θ) at every pixel is calculated. The values of cos(θ) for every pixel is shown in FIGS. 11A through 11U.

Further, to estimate brightness of the light source, the angle between the surface normal and light source is normalized. The surface brightness is proportional to cos(θ) *brightness of the light source:

Brightness of light source equal the pixel value/cos(θ).

Further, an average of (pixel value/cos(θ)) is obtained to determine the brightness of the light source. The light intensity of each pixel is as shown in FIGS. 11A through 11U. The average value of the actual brightness for each block is 122.103, 158.3, and 127.2, respectively.

The target is calculated by taking Fourier transform of the actual value of light source and drop flicker frequencies which is 100 hz and 120 hz. Next, the 100 hz and 120 hz frequency are removed and the remaining values are 407, 32 and 0 respectively. The inverse FTT is obtained from the resultant frequencies to calculate the target brightness. The target brightness obtained after the inverse FTT is 146, 130, and 130.

The actual brightness of the light source is plotted versus the calculated target brightness as shown in FIG. 11H. As seen in the FIG. 11J, there are less fluctuations in target brightness curve and the fluctuations which are present are not due to flicker.

The next step is to calculate the angle based factor. A difference of target brightness from current brightness is calculated to calculate the angle based factor and the values obtained are 23.8967, −28.25, and 2.791. Further, the average of $\cos(\theta)$ is calculated for every frame to normalize the $\cos(\theta)$ map and the values obtained are 0.7224, 0.743 and 0.798. Finally, the angle based factor is determined using the formula $Bp=(T-C)\cos(\theta)/A$ as shown on FIGS. 11I through 11K.

The AI based factor is then calculated to fine-tune angle based factor. The AI based factor considers properties of the frame to form AI factor (properties which are not considered by angle based factor). Embedding of the frame is generated using CNN. The embedding generated using the CNN model encapsulates many properties of the image, for example, texture of the image, reflectance property etc. These embeddings are passed through the LSTM which outputs the AI factor. The AI factor is as seen in FIGS. 11L through 11N.

Further, the AI facto is normalized as to not change the average brightness of the frame. The average of AI factor is calculated and further divide the AI factor with its average. The average of the AI factor is 0.7484, 0.711 and 0.714 respectively. Further, the normalized AI based factor is shown in FIGS. 11O through 11Q.

The resultant de-flickering factors obtained by multiplying the angle based factor with the normalized AI factor and is given by FIGS. 11R through 11T. The final de-flickering factor value is added to each pixel of original flicker frame to get the de-flickered pixel value. Resultant de-flickering factor equals angle based factor*normalized AI factor The final de-flickering factor value is added to each pixel of original flicker frame to get the de-flickered pixel value. The de-Flicker light intensity equals resultant de-flickering factor+light intensity of the frame (Avg. $RGB/\cos(\theta)$).

The de-flicker light intensity is multiplied with $\cos(\theta)$ to get flicker free frames. Flicker free frame is equal to the de-flickering light intensity*$\cos(\theta)$, as shown in FIG. 11U.

The foregoing description of the embodiments will so fully reveal the general nature of the embodiments herein that others can, by applying current knowledge, readily modify and/or adapt for various applications such embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for removing flicker in a video by an electronic device, the method comprising:
    obtaining a plurality of red-green-blue (RGB) video frames of a scene in a field of preview of a camera included in the electronic device;
    obtaining a position of at least one light source in a three dimensional (3D) space from the plurality of RGB video frames;
    obtaining a brightness of the at least one light source based on the position of the light source;
    obtaining a de-flickering factor for at least one pixel in the plurality of RGB video frames based on the position of the at least one light source and the brightness of the at least one light source; and
    applying the de-flickering factor to at least one of the plurality of RGB video frames to remove the flicker.

2. The method of claim 1, wherein the obtaining the position of at least one light source in the plurality of RGB video frames comprises:
    identifying at least one region of a maximum brightness in the plurality of RGB video frames as a bright cluster;
    obtaining a three dimensional (3D) map of the scene based on a depth map of the scene; and
    obtaining the position of the at least one light source based on the identified bright cluster and the 3D map of the scene.

3. The method of claim 2, wherein the obtaining the position of the at least one light source based on the bright cluster and the 3D map comprises:
    obtaining a surface perpendicular and an angle of reflection of the at least one light source;
    obtaining an incident angle of the at least one light source;
    obtaining a direction of the at least one light source based on the incident angle;
    determining that a plurality of incident rays of light from the at least one light source intersect with each other; and
    obtaining the position of the at least one light source as an interaction point of the plurality of incident rays of light from the at least one light source.

4. The method of claim 1, wherein the obtaining the brightness of the at least one light source based on the position of the light source comprises:
    obtaining an actual brightness of the at least one light source based on the 3D map of the scene and the position of the at least one light source; and
    obtaining a target brightness of the at least one light source based on the actual brightness of the at least one light source.

5. The method of claim 4, wherein the obtaining the actual brightness of the at least one light source based on the 3D map of the scene and the position of the at least one light source comprises:
    obtaining a light intensity for each of the plurality of RGB video frames based on the 3D map, the plurality of RGB video frames, and the position of the at least one light source; and
    obtaining the actual brightness based on an average of the light intensities for each of the plurality of RGB video frames.

6. The method of claim 4, wherein the obtaining the target brightness of the at least one light source comprises:
    obtaining a trend of frame brightness from each of the plurality of RGB video frames based on the actual brightness;

obtaining a Fourier transform of the frame brightness for each of the plurality of RGB video frames;
excluding frames having frequencies of 100 hz and 120 hz; and
obtaining the target brightness of the at least one light source as an inverse Fourier transform of remaining frames.

7. The method of claim 1, wherein the obtaining the de-flickering factor comprises:
obtaining an angle based de-flickering factor based on a three dimensional (3D) map of the scene, the position of the at least one light source, an actual brightness of the at least one light source, and a target brightness of the at least one light source, wherein the angle based de-flickering factor is a matrix of numbers added to a frame to remove flicker;
obtaining an artificial intelligence (AI) based de-flickering factor based on the plurality of RGB video frames;
combining the angle based de-flickering factor and the AI based de-flickering factor; and
obtaining the de-flickering based on the angle based de-flickering factor and the AI based de-flickering factor,
wherein the angle based de-flickering factor is multiplied with the AI based de-flickering factor to obtain the de-flickering factor.

8. The method of claim 7, wherein the obtaining the angle based de-flickering factor comprises:
obtaining an incident angle towards the at least one light source;
obtaining a cosine of the incident angle;
obtaining an average of the cosine for each pixel in the plurality of RGB video frames; and
obtaining the angle based de-flickering factor as a combination of the average of the cosine, the target brightness of the at least one light source, and the actual brightness of the at least one light source,
wherein the angle based de-flickering factor is a value obtained for each pixel and is configured to be added to each pixel for removing the flicker.

9. The method of claim 7, wherein the obtaining the AI based de-flickering factor comprises:
sending the plurality of RGB video frames as an input to an AI model; and
receiving the AI based de-flickering factor from the AI model based on the input.

10. The method of claim 8, wherein the applying the de-flickering factor to each of the plurality of RGB video frames to remove the flicker comprises:
adjusting each pixel in the plurality of RGB video frames based on an angle between the surface normal and the light source;
adding a light intensity with the resultant de-flickering factor to obtain de-flickered light intensities; and
multiplying the de-flickered light intensity with the cosine to obtain frames without flicker.

11. An electronic device for removing flicker from a video, the electronic device comprising:
a memory;
a camera; and
at least one processor coupled to the memory and the camera, wherein the at least one processor is configured to:
obtain a plurality of red-green-blue (RGB) video frames of a scene in a field of preview of the camera;
obtain a position of at least one light source in a three dimensional (3D) space from the plurality of RGB video frames;
obtain a brightness of the at least one light source based on the position of the light source;
obtain a de-flickering factor for at least one pixel in the plurality of RGB video frames based on the position of the at least one light source and the brightness of the at least one light source; and
apply the de-flickering factor to at least one of the plurality of RGB video frames to remove the flicker.

12. The electronic device of claim 11, wherein to obtain the position of at least one light source in the plurality of RGB video frames, the at least one processor is further configured to:
identify at least one region of a maximum brightness in the plurality of RGB video frames as a bright cluster;
obtain a three dimensional (3D) map of the scene based on a depth map of the scene; and
obtain the position of the at least one light source based on the identified bright cluster and the 3D map of the scene.

13. The electronic device of claim 12, wherein to obtain the position of the at least one light source based on the bright cluster and the 3D map, the at least one processor is further configured to:
obtain a surface perpendicular and an angle of reflection of the at least one light source;
obtain an incident angle of the at least one light source;
obtain a direction of the at least one light source based on the incident angle;
determine that a plurality of incident rays of light from the at least one light source intersect with each other; and
obtain the position of the at least one light source as an interaction point of the plurality of incident rays of light from the at least one light source.

14. The electronic device of claim 11, wherein to obtain the brightness of the at least one light source based on the position of the light source, the at least one processor is further configured to:
obtain an actual brightness of the at least one light source based on the 3D map of the scene and the position of the at least one light source; and
obtain a target brightness of the at least one light source based on the actual brightness of the at least one light source.

15. The electronic device of claim 14, wherein to obtain the actual brightness of the at least one light source based on the 3D map of the scene and the position of the at least one light source, the at least one processor is further configured to:
obtain a light intensity for each of the plurality of RGB video frames based on the 3D map, the plurality of RGB video frames and the position of the at least one light source; and
obtain the actual brightness based on an average of the light intensities for each of the plurality of RGB video frames.

16. The electronic device of claim 14, wherein to obtain the target brightness of the at least one light source, the at least one processor is further configured to:
obtain a trend of frame brightness from each the plurality of RGB video frames based on the actual brightness;
obtain a Fourier transform of the frame brightness for each of the plurality of RGB video frames;
exclude frames having frequencies of 100 hz and 120 hz; and obtain the target brightness of the at least one light source as an inverse Fourier transform of remaining frames.

17. The electronic device of claim 11, wherein to obtaining the de-flickering factor, the at least one processor is further configured to:
   obtain an angle based de-flickering factor based on a three dimensional (3D) map of the scene, the position of the at least one light source, an actual brightness of the at least one light source, and a target brightness of the at least one light source, wherein the angle based de-flickering factor is a matrix of numbers added to a frame to remove flicker;
   obtain an artificial intelligence (AI) based de-flickering factor based on the plurality of RGB video frames;
   combine the angle based de-flickering factor and the AI based de-flickering factor; and
   obtain the de-flickering based on the e angle based de-flickering factor and the AI based de-flickering factor,
   wherein the angle based de-flickering factor is multiplied with the AI based de-flickering factor for obtaining the de-flickering factor.

18. The electronic device of claim 17, wherein to obtain the angle based de-flickering factor, the at least one processor is further configured to:
   obtain an incident angle towards the at least one light source;
   obtain a cosine of the incident angle;
   obtain an average of the cosine for each pixel in the plurality of RGB video frames; and
   obtain, the angle based de-flickering factor as a combination of the average of the cosine, the target brightness of the at least one light source and the actual brightness of the at least one light source, wherein the angle based de-flickering factor is a value obtained for each pixel and is configured to be added each pixel for removing the flicker.

19. The electronic device of claim 17, wherein to obtain the AI based de-flickering factor, the at least one processor is further configured to:
   send the plurality of RGB video frames as an input to an AI model; and
   receive the AI based de-flickering factor from the AI model based on the input.

20. The electronic device of claim 18, wherein to apply the de-flickering factor to each of the plurality of RGB video frames to remove the flicker, the at least one processor is further configured to:
   adjust each pixel in the plurality of RGB video frames based on an angle between the surface normal and the light source;
   add a light intensity with the resultant de-flickering factor to obtain de-flickered light intensities; and
   multiply the de-flickered light intensity with the cosine to obtain frames without flicker.

* * * * *